United States Patent
Bily et al.

(10) Patent No.: US 11,163,037 B2
(45) Date of Patent: Nov. 2, 2021

(54) ANTENNA ARRAY THAT INCLUDES ANALOG BEAM-STEERING TRANSMIT ANTENNA AND ANALOG BEAM-STEERING RECEIVE ANTENNA ARRANGED ORTHOGONALLY TO THE TRANSMIT ANTENNA, AND RELATED SUBSYSTEM, SYSTEM, AND METHOD

(71) Applicant: Echodyne Corp., Kirkland, WA (US)

(72) Inventors: Adam Bily, Seattle, WA (US); Tom Driscoll, Bellevue, WA (US); John Desmond Hunt, Seattle, WA (US); Charles A. Renneberg, Seattle, WA (US); Ioannis Tzanidis, Woodinville, WA (US); Robert Tilman Worl, Issaquah, WA (US)

(73) Assignee: Echodyne Corp., Bellevue, WA (US)

( * ) Notice: Subject to any disclaimer, the term of this patent is extended or adjusted under 35 U.S.C. 154(b) by 145 days.

(21) Appl. No.: 16/019,371

(22) Filed: Jun. 26, 2018

(65) Prior Publication Data
US 2018/0372837 A1   Dec. 27, 2018

Related U.S. Application Data

(60) Provisional application No. 62/525,133, filed on Jun. 26, 2017, provisional application No. 62/572,043, (Continued)

(51) Int. Cl.
*G01S 7/03*       (2006.01)
*H01Q 21/22*      (2006.01)
(Continued)

(52) U.S. Cl.
CPC ............. *G01S 7/032* (2013.01); *G01S 13/04* (2013.01); *G01S 13/931* (2013.01);
(Continued)

(58) Field of Classification Search
CPC ........ G01S 7/032; G01S 13/933; G01S 13/04; G01S 13/931; H01Q 1/28; H01Q 1/3233; H01Q 3/24; H01Q 21/065; H01Q 21/22
(Continued)

(56) References Cited

U.S. PATENT DOCUMENTS 8,248,298 B2 * 8/2012 Lalezari ................. H01Q 21/24
                                                      342/120
9,869,762 B1 * 1/2018 Alland .................... H01Q 21/28
(Continued)

FOREIGN PATENT DOCUMENTS

WO   2017078184 A1     5/2017
WO   WO-2017078184 A1 * 5/2017 ........... H01Q 1/3266
(Continued)

OTHER PUBLICATIONS

"Fan beam Electromagnetism", Academic Press Dictionary of Science and Technology 4th ed.) 1992, Elsevier Science & Technology, Credo Reference: https://search.credoreference.com/content/entry/apdst/fan_beam/0.
(Continued)

*Primary Examiner* — Vladimir Magloire
*Assistant Examiner* — Alexander L. Syrkin
(74) *Attorney, Agent, or Firm* — Fogg & Powers LLC

(57) ABSTRACT

An embodiment of an antenna array includes a transmit antenna and a receive antenna. The transmit antenna has, in one dimension, a first size, and has, in another dimension that is approximately orthogonal to the one dimension, a second size that is greater than the first size. And the receive antenna has, in approximately the one dimension, a third size that is greater than the first size, and has, in approximately the other dimension, a fourth size that is less than the second size. For example, such an antenna array, and a radar system that incorporates the antenna array, can provide a (Continued)

high Rayleigh resolution (i.e., a narrow Half Power Beam Width (HPBW)) with significantly reduced aliasing as compared to prior antenna arrays and radar systems for a given number of antenna-array channels.

39 Claims, 10 Drawing Sheets

Related U.S. Application Data filed on Oct. 13, 2017, provisional application No. 62/555,571, filed on Sep. 7, 2017.

(51) Int. Cl.
| | |
|---|---|
| H01Q 1/32 | (2006.01) |
| H01Q 1/28 | (2006.01) |
| G01S 13/931 | (2020.01) |
| G01S 13/04 | (2006.01) |
| H01Q 3/24 | (2006.01) |
| H01Q 21/06 | (2006.01) |
| G01S 13/933 | (2020.01) |

(52) U.S. Cl.
CPC ............. *G01S 13/933* (2020.01); *H01Q 1/28* (2013.01); *H01Q 1/3233* (2013.01); *H01Q 3/24* (2013.01); *H01Q 21/065* (2013.01); *H01Q 21/22* (2013.01)

(58) Field of Classification Search
USPC .......................................................... 342/27
See application file for complete search history.

(56) References Cited

U.S. PATENT DOCUMENTS

| | | | | |
|---|---|---|---|---|
| 10,446,920 | B1* | 10/2019 | Meador | B32B 3/30 |
| 2007/0132631 | A1* | 6/2007 | Henson | G01S 13/89 |
| | | | | 342/25 R |
| 2007/0279294 | A1 | 12/2007 | York | |
| 2010/0141527 | A1* | 6/2010 | Lalezari | H01Q 21/24 |
| | | | | 342/368 |
| 2012/0068882 | A1* | 3/2012 | Blachford | G01S 13/48 |
| | | | | 342/104 |
| 2012/0139786 | A1* | 6/2012 | Puzella | H01Q 1/3216 |
| | | | | 342/368 |
| 2012/0194399 | A1 | 8/2012 | Bily et al. | |
| 2014/0070994 | A1* | 3/2014 | Schmalenberg | H01Q 1/3233 |
| | | | | 342/368 |
| 2014/0105054 | A1* | 4/2014 | Sægrov | H01Q 3/267 |
| | | | | 370/252 |
| 2014/0266919 | A1 | 9/2014 | Chen | |
| 2015/0229032 | A1* | 8/2015 | Liu | H01Q 3/20 |
| | | | | 343/766 |
| 2015/0318618 | A1* | 11/2015 | Chen | H01Q 21/005 |
| | | | | 343/750 |
| 2015/0355313 | A1* | 12/2015 | Li | G01S 13/02 |
| | | | | 342/195 |
| 2015/0380828 | A1* | 12/2015 | Black | H01H 59/0009 |
| | | | | 343/771 |
| 2016/0011307 | A1* | 1/2016 | Casse | G01S 13/931 |
| | | | | 701/93 |
| 2016/0372834 | A1* | 12/2016 | Bily | H01Q 15/0066 |
| 2017/0061799 | A1* | 3/2017 | Fujii | B60W 30/12 |
| 2017/0187123 | A1 | 6/2017 | Black et al. | |
| 2018/0040955 | A1 | 2/2018 | Vouvakis et al. | |
| 2019/0074600 | A1* | 3/2019 | Bily | G01S 7/032 |
| 2019/0115651 | A1 | 4/2019 | Driscoll et al. | |

FOREIGN PATENT DOCUMENTS

| | | | | |
|---|---|---|---|---|
| WO | 2019005870 A1 | 1/2019 | | |
| WO | WO-2019005870 A1 * | 1/2019 | ............... | H01Q 3/24 |
| WO | 2019172955 A2 | 9/2019 | | |
| WO | WO-2019172955 A2 * | 9/2019 | ............... | H01Q 3/28 |

OTHER PUBLICATIONS

Huang et al., "Antennas: From Theory to Practice", Wiley, Jun. 18, 2008, pp. 1 through 7, A John Wuiley and Sons, Ltd, Publication.
Sakakibara, "High-gain Millimeter-wave Planar Array Antennas with Traveling-wave Excitation", Radar Technology, Dec. 2009, pp. 1 through 24, www.intechopen.com.
U.S. Patent and Trademark Office, "Notice of Allowance", U.S. Appl. No. 16/125,486, dated Apr. 21, 2021, pp. 1 through 13, Published: US.
U.S. Patent and Trademark Office, "Final Office Action", U.S. Appl. No. 16/159,567, dated Apr. 29, 2021, pp. 1 through 11, Published: US.
U.S. Patent and Trademark Office, "Supplemental Notice of Allowability", U.S. Appl. No. 16/125,486, dated May 27, 2021, pp. 1 through 6, Published: US.
International Bureau, "International Preliminary Report on Patentability from PCT Application No. PCT/US2018/050090", from Foreign Counterpart to U.S. Appl. No. 16/125,486, dated Mar. 19, 2020, pp. 1-13, Published: WO.
International Bureau, "International Preliminary Report on Patentability from PCT Application No. PCT/US2018/039600", from Foreign Counterpart to U.S. Appl. No. 16/019,371, dated Jan. 9, 2020, pp. 1-12, Published: WO.
International Bureau, "International Preliminary Report on Patentability from PCT Application No. PCT/US2018/055737", from Foreign Counterpart to U.S. Appl. No. 16/159,567, dated Apr. 23, 2020, pp. 1 through 17, Published: WO.
U.S. Patent and Trademark Office, "Office Action", U.S. Appl. No. 16/125,486, dated Nov. 25, 2020, pp. 1 through 70, Published: US.
International Searching Authority, "International Search Report and Written Opinion from PCT Application No. PCT/US2018/055737 dated Apr. 18, 2019", from Foreign Counterpart to U.S. Appl. No. 16/159,567, pp. 1-25, Published: WO.
International Searching Authority, "Invitation to Pay Additional Fees from PCT Application No. PCT/US2018/055737 dated Jan. 31, 2019", from Foreign Counterpart to U.S. Appl. No. 16/159,567, pp. 1-21, Published: WO.
Martinez et al., "High-Efficiency FET/Microstrip-Patch Oscillators", IEEE Antennas and Propagation Magazine, Feb. 1994, pp. 16-19, vol. 36, No. 1, IEEE.
Park et al., "A Slotted Post-Wall Waveguide Array With Interdigital Structure for 45° Linear and Dual Polarization", IEEE Transaction on Antennas and Propagation, Sep. 2005, pp. 2865-2871, vol. 53, No. 9, IEEE.
U.S. Patent and Trademark Office, "Office Action", U.S. Appl. No. 16/159,567, dated Oct. 16, 2020, pp. 1 through 47, Published: US.
Harter, Marlene et al. "Realization of an Innovative 3D Imaging Digital Beamforming Radar System"; 2011 IEEE CIE International Conference; Oct. 24, 2011; pp. 186-189.
International Searching Authority; Notification of Transmittal of the International Search Report and the Written Opinion of the International Searching Authority from PCT Application No. PCT/US2018/039600 dated Oct. 9, 2018; from Foreign Counterpart of U.S. Appl. No. 16/019,371; pp. 1-19; Published: EP.
U.S. Patent and Trademark Office, "Restriction Requirement", U.S. Appl. No. 16/159,567, dated Jun. 11, 2020, pp. 1 through 6, Published: US.
Hassanien et al., "Phased-MIMO Radar: A Tradeoff Between Phased-Array and MIMO Radars", Aug. 15, 2009, pp. 1-34.
International Searching Authority, "International Search Report and Written Opinion from PCT Application No. PCT/US2018/050090

(56) References Cited

OTHER PUBLICATIONS dated Oct. 1, 2019", from Foreign Counterpart to U.S. Appl. No. 16/125,486, pp. 1-19, Published: WO.

* cited by examiner

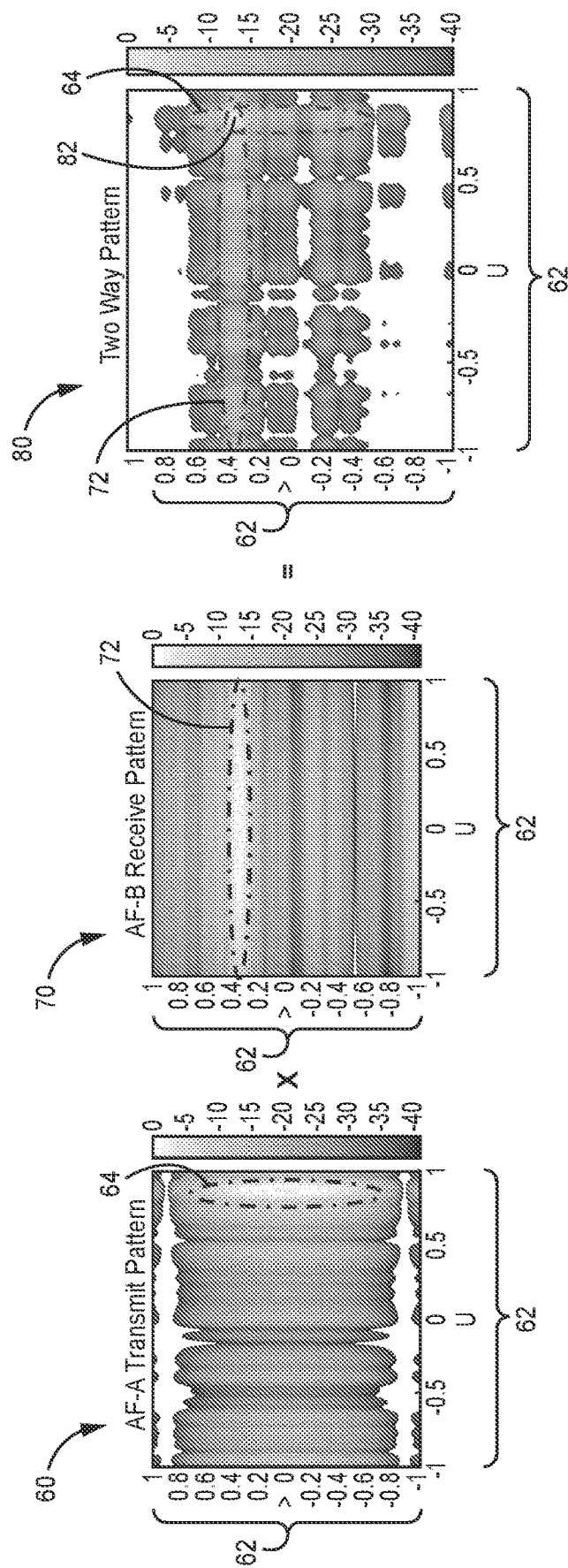

ANTENNA ARRAY THAT INCLUDES ANALOG BEAM-STEERING TRANSMIT ANTENNA AND ANALOG BEAM-STEERING RECEIVE ANTENNA ARRANGED ORTHOGONALLY TO THE TRANSMIT ANTENNA, AND RELATED SUBSYSTEM, SYSTEM, AND METHOD

PRIORITY CLAIM

This patent application claims priority to the following U.S. patent applications, all of which are incorporated by reference herein.

U.S. Provisional Patent Application Ser. No. 62/572,043, entitled BEAM-STEERING ANTENNA, which was filed 13 Oct. 2017.

U.S. Provisional Patent Application Ser. No. 62/555,571, entitled ANTENNA ARRAY HAVING DIFFERENT BEAM-STEERING RESOLUTION IN ONE DIMENSION THAN IN ANOTHER DIMENSION, which was filed 7 Sep. 2017.

U.S. Provisional Patent Application Ser. No. 62/525,133, entitled RADAR SYSTEM WITH ANTENNA ARRAY THAT INCLUDES ANALOG BEAM STEERING TRANSMIT ANTENNA AND ANALOG BEAM STEERING RECEIVE ANTENNA ARRANGED ORTHOGONALLY TO THE TRANSMIT ANTENNA, which was filed 26 Jun. 2017.

BACKGROUND

Not Applicable

SUMMARY

A traditional radar system that includes a traditional phased-array antenna (hereinafter "phased array) is unsuitable for some applications due to, e.g., its cost, size, weight, and power (C-SWAP) limitations and the number of array elements per unit area (element density). For example, the phased array of a traditional radar system is too dense, scans a field of view (FOV) too slowly, and the radar system too expensive, for use in a self-driving (hereinafter "autonomous") automobile. Similarly, the phased array of a traditional radar system is too dense, and the radar system too expensive, too heavy, and too power hungry, for use in a small unmanned aerial vehicle (UAV) such as a drone.

Therefore, antennas and radar systems that are lighter, less-dense, less-expensive, can quickly scan a FOV, and are less power-hungry than traditional antennas and radar systems have been developed for such applications.

An example of such a radar system, which has been developed for use in autonomous automobiles, includes a digital beam-forming (DBF) receive antenna array having, e.g., four to eight individual antenna segments (the number of antenna segments is typically limited to the number of antenna channels that the system circuitry supports, e.g., one antenna segment per antenna channel). During a transmit period, the radar-system circuitry effectively energizes all of the transmit antenna segments with the same signal, i.e., with respective signals each having approximately the same magnitude and phase, such that the array "blasts" or "sprays" signal energy over a fixed FOV. Said in a different way, the simultaneous energizing of all the antenna segments with respective signals each having approximately the same magnitude and phase generates a transmit beam that is stationary, i.e., not steered. In order to cover a useable FOV, this transmit beam is often fairly wide, e.g. more than 20° in the azimuth (AZ) dimension.

During a receive period, which can be coincident with the transmit period, the system circuitry can post-process, dynamically, a respective gain and a respective phase shift from each receive antenna segment, so as to form and to steer, digitally, a receive beam that is significantly narrower than the transmit beam, and can apply super-resolution techniques in an attempt to discern additional information regarding the angular origin of the signals received by the receive antenna segments. The system can steer the receive beam to only a single position, or to multiple positions, within a single receive period.

Unfortunately, a problem with such a radar system is that the receive digital beam forming can be performed only within a region illuminated by the transmit beam. The number of receive-array channels that are present are utilized to divide the fixed transmit FOV into equal segments, thus defining the receive resolution of the DBF receive antenna array, and ultimately defining the receive resolution of the entire radar system. This resolution is often referred to as the Rayleigh resolution, and represents a fundamental limit of the radar performance. For example, a radar system that illuminates an FOV of 20° in the AZ dimension during the transmit period and that contains four receive channels could possess a Rayleigh resolution of approximately 10° in AZ across this FOV. An alternate choice could be made to widen the FOV in AZ to 40°, which, with those same four receiver channels, would give a Rayleigh resolution of approximately 20° in AZ across this FOV. Thus a fundamental trade-off exists in such a system, the tradeoff being the wider the FOV illuminated during the transmit period, the lower the Rayleigh resolution, and the higher the Rayleigh resolution, the narrower, and thus the more restricted, the FOV that the radar system illuminates.

Creating a radar system of this type that illuminates a relatively large FOV during a transmit period, but still possesses a relatively high Rayleigh resolution, would require a relatively large number of antenna segments, and, therefore, would require a relatively large number of antenna channels. Engineering limits to the practical number of antenna channels that an antenna of a radar system can included have, to date, limited the Rayleigh performance of such antennas and the radars systems that include such antennas.

One approach to improve the Rayleigh resolution of an antenna in a system with a fixed number of antenna channels is to place the receive antenna segments further apart, i.e., to form a sparse receive array with a larger aperture.

However, such a sparse array can cause spatial aliasing, which produces side-lobes and grating lobes that can hinder greatly the radar system's ability to detect, identify, and map objects within the radar-system antenna's FOV. One reason for such aliasing-induced side-lobes is that the radar system's receive antenna array does not meet the Nyquist criteria for maximum spacing between adjacent antenna segments, which maximum spacing is $\frac{1}{2}\lambda$, where $\lambda$ is the minimum wavelength of an electromagnetic wave/signal in the medium for which the antenna array is configured to transmit and to receive electromagnetic signals. For example, if the antenna array is configured to transmit and receive electromagnetic signals in air, then, as is known, $\lambda \approx \lambda_0$, where $\lambda_0$ is the wavelength of an electromagnetic wave/signal that is propagating in free space. Further in example, for an antenna array to have a Rayleigh resolution of 1° in the AZ dimension, the antenna array would need to have dimensions on the order of 50λ, particularly in the AZ dimension. Distributing a relatively small number of antenna segments/channels, e.g., four to eight, across a distance of 50λ results in an average spacing between adjacent antenna segments of 6.25λ to 12.5λ, which is 12 to 25 times the maximum Nyquist spacing of ½λ; consequently, such an antenna array, and a system including the antenna array, would suffer from generating significant grating lobes.

Of course, to reduce spatial aliasing, an antenna designer can reduce the effective size/aperture of the antenna by reducing the spacing between adjacent antenna segments, or he/she can add additional antenna segments to reduce the sparsity of the antenna array.

But reducing the size/aperture of the antenna array limits the minimum width of the receive beam that the radar system can generate, and the ability to add antenna segments is typically limited by the cost and complexity requirements of the system.

Therefore a designer of a radar system including such a sparse antenna array (i.e., an antenna array with a limited number of antenna segments due to the system circuitry including only a limited number of channels) is faced with trading off beam width for aliasing, and vice-versa. That is, for a given number of antenna segments, the narrower the receive-beam width (i.e., the higher the receive-beam resolution within the antenna's FOV), the greater the level of aliasing, and the lesser the level of aliasing, the wider the receive-beam width (i.e., the lower the receive-beam resolution within the antenna's FOV).

Recently, Multiple Input Multiple Output (MIMO) techniques have allowed the use of sparse arrays in a new way by utilizing multiple transmit channels with orthogonal waveforms and carefully designed receive antenna segments to improve the angular resolution of radar systems that include such sparse arrays without the addition of many more antenna channels.

Unfortunately, only so much can be gained even with MIMO techniques, which do not fully allow for fine-resolution imaging in both the AZ and elevation (EL) dimensions.

An embodiment of an antenna array includes a transmit antenna and a receive antenna. The transmit antenna has, in one dimension, a first size, and has, in another dimension that is approximately orthogonal to the one dimension, a second size that is greater than the first size. And the receive antenna has, in approximately the one dimension, a third size that is greater than the first size, and has, in approximately the other dimension, a fourth size that is less than the second size.

For example, such an antenna array, and a radar system that incorporates the antenna array, can provide a high Rayleigh resolution (i.e., a narrow Half Power Beam Width (HPBW)) with significantly reduced aliasing as compared to prior antenna arrays and radar systems for a given number of antenna-array channels. The antenna array can include an analog transmit antenna, and the radar system can be configured with the ability to adjust, electronically, the transmit beam pattern (e.g., to steer the transmit beam) and to act as a spatial anti-aliasing filter for the receive antenna pattern. And the antenna array also can include an analog receive antenna, where the radar system can be configured with the ability to adjust, electronically, the receive beam pattern (e.g., to steer the receive beam) and to act as a spatial anti-aliasing filter for the transmit antenna pattern. Said another way, the combination of the transmit-antenna pattern and the receive-antenna pattern results in effective transmit and receive beams that are significantly narrower than either the transmit antenna or the receive antenna can generate by itself. By appropriately designing and controlling the transmitting and receiving antennas, the radar system effectively can generate and steer a beam of narrow HPBW (e.g., ≤5° in both the AZ and EL dimensions). Moreover, the radar system can reduce spatial aliasing in this manner without requiring the large number of antenna channels (e.g., 64 to 128) typically required for such performance. For example, an embodiment of a radar system with only two antenna channels, one antenna channel for the transmit antenna and the other antenna channel for the receive antenna, effectively can generate and steer a beam effectively having a HPBW of approximately 5° in AZ and 5° EL; therefore, for a given number of antenna channels, such a radar system can have significantly better angular performance than prior radar systems.

BRIEF DESCRIPTION OF THE DRAWINGS

FIG. 4 is a diagram of a beam pattern that the transmit array of FIG. 1 is configured to generate across a FOV, according to an embodiment.

FIG. 5 is a diagram of a beam pattern that the receive array of FIG. 1 is configured to generate across the same FOV as in FIG. 4, according to an embodiment.

FIG. 6 is a diagram of a resulting beam pattern, which is the combination of the transmit and receive beam patterns of FIG. 4 and of FIG. 5, respectively, across the same FOV as in FIGS. 4-5 at the same instant of time represented by FIGS. 4-5, according to an embodiment.

DETAILED DESCRIPTION

Each value, quantity, or attribute herein preceded by "substantially," "approximately," "about," a form or derivative thereof, or a similar term, encompasses a range that includes the value, quantity, or attribute ±20% of the value, quantity, or attribute, or a range that includes ±20% of a maximum difference from the value, quantity, or attribute. For example, "two antenna arrays are approximately orthogonal to one another" encompasses an angle 72°≤α≤108° between the two planes (|90°| is the angular difference between the two planes when they are orthogonal to one another, and ±20% of |90°| is ±18°). Furthermore, each range a-b herein preceded by "substantially," "approximately," "about," a form or derivative thereof, or a similar term, encompasses a range (a−20%(|a-b|)) to (b+20%(|a-b|))

Figure 1:
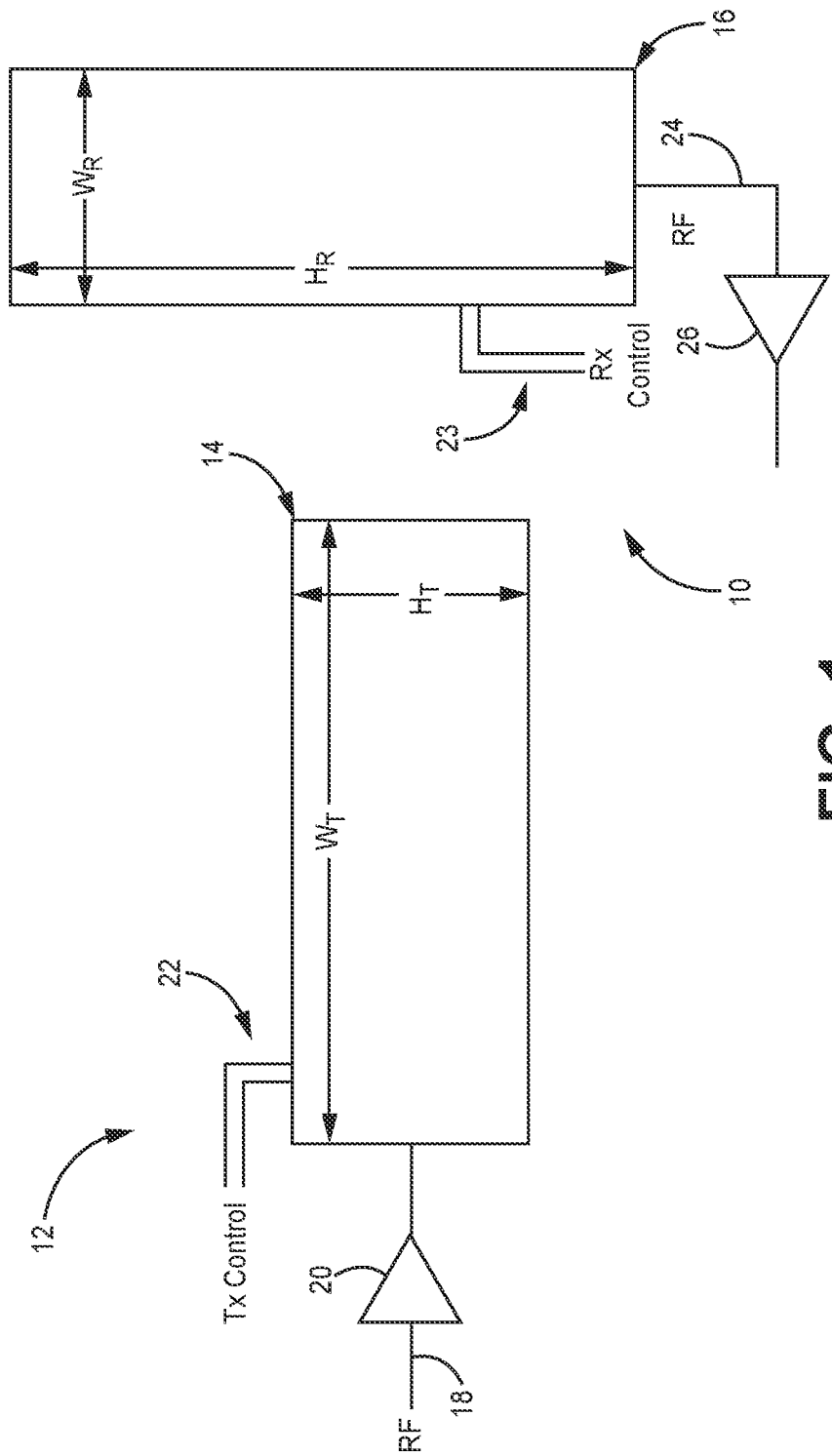
FIG. 1 is a diagram of a transmit/receive antenna array of a radar system, according to an embodiment.

FIG. 1 is a diagram of a transmit/receive antenna array 10 of a radar system 12, according to an embodiment. The radar system 12 can include other components not shown in FIG. 1, such as amplifiers, phase shifters, and other drive circuitry that are omitted from FIG. 1. Furthermore, the radar system 12 can be configured to operate in any conventional radar frequency band; for example, the radar system can be configured to operate in the W band, which ranges from 75 GHz-110 GHz, and can be tuned for operation approximately between 76 GHz-81 GHz.

The transmit/receive antenna array 10 includes a transmit antenna 14 and a receive antenna 16, according to an embodiment.

The transmit antenna 14 is a Single Input Multiple Output (SIMO) Metamaterial Electronic Steering Array (MESA), according to an embodiment. The transmit antenna 14 can be formed from one or more antenna sections, and can include one or more electronic steering/switching subarrays (ESA), for instance, but not necessarily, a MESA. Furthermore, the transmit antenna 14 can have any suitable dimensions, such as of approximately $(W_T=10\lambda) \times (H_T=1.5\lambda)$, where $\lambda$ is the wavelength for which the transmit antenna is configured to have a suitable performance (e.g., the center of the frequency band of interest) in a transmission medium (e.g. air) in which the transmit antenna is configured to transmit one or more signals. That is, $\lambda$ depends both on the frequency band and the transmission medium in which the transmit antenna 14 is configured to operate.

The transmit antenna 14 includes one or more ESAs, which together include one analog RF channel input 18 configured to receive an RF transmit signal, which the ESA distributes throughout the ESA area and/or to the antenna elements of the ESA by conventional methods and structures, e.g., one or more of a waveguide, transmission line, strip line, or microstrip. The radar system 12 can also include a low-noise power amplifier 20 configured to amplify the RF transmit signal. Because all of the one or more ESAs that form the transmit antenna 14 receive the same RF signal from the same RF channel input 18, the transmit antenna is described as being a Single Input (SI) antenna (the transmit antenna is described as being Multiple Output (MO) because the one or more ESAs collectively include multiple antenna cells each having one or more antenna elements).

Each ESA also includes one or more control lines 22, which are configured to receive either a digital or an analog signal, and which provide for the electronic control of the transmit-section beam steering. This control may be implemented as a single digital line, a collection of digital lines (bus), or as a collection of analog lines.

Furthermore, the control lines 22 are configured to carry respective control signals that, depending on the collective state of the control signals over time (e.g., logic high or logic low digital signals, or an array of analog voltages), electronically activate a particular configuration of the transmit antenna 14, the particular configuration describing a particular transmit-beam position, transmit-beam side-lobe level, transmit-beam HPBW, etc. And by changing the configuration of the transmit antenna 14 over time, the radar system can steer the transmit beam by sequencing the beam through a series of positions.

Moreover, if the transmit antenna 14 includes multiple ESAs, then these multiple ESAs may be configured to work together by the radar system coordinating and synchronizing the configurations sent via the respective control lines 22.

The receive antenna 16 is similar to the transmit antenna 14 except that the receive antenna is configured to generate, in response to a signal received from a source (e.g., an object that redirects a signal transmitted by the transmit antenna 14 to the receive antenna) remote from the receive antenna, a single RF signal on a single channel output 24 to an optional RF low-noise power amplifier 26. Furthermore, the control lines 23 to the receive antenna 16 are typically different than the control lines 22 to the transmit antenna 14.

For example, the receive antenna 16 is a SIMO MESA, according to an embodiment. The receive antenna 16 can be formed from one or more antenna sections, and can include one or more electronic steering/switching subarrays (ESA), for instance, but not necessarily, a MESA. Furthermore, the receive antenna 16 can have any suitable dimensions, such as of approximately $(H_R=10\lambda) \times (W_R=1.5\lambda)$, where $\lambda$ is the wavelength for which the receive antenna is configured to have a suitable performance (e.g., the center of the frequency band of interest) in a reception medium (e.g. air) in which the receive antenna is configured to receive one or more signals. That is, $\lambda$ depends both on the frequency band and the reception medium in which the receive antenna 16 is configured to operate.

The receive antenna 16 includes one or more ESAs, which together include one analog RF channel output 26 configured to provide an RF receive signal to an optional low-noise amplifier (LNA) 26, which amplifiers the RF receive signal, and provides the amplified RF receive signal to DBF circuitry (not shown in FIG. 1) of the radar system. Because all of the one or more ESAs that form the receive antenna 16 combine the signals that they receive onto a same, single, RF channel output channel 24, the receive antenna is described as being a Multiple Input (MI) Single Output (SO), or MISO, antenna (the receive antenna is described as being Multiple Input (MI) because the one or more ESAs collectively include multiple antenna cells each having one or more antenna elements).

Each ESA also includes one or more control lines 23, which are configured to receive either a digital or an analog signal, and which provide for the electronic control of the receive-section beam steering. This control may be implemented as a single digital line, a collection of digital lines (bus), or as a collection of analog lines.

Furthermore, the control lines 23 are configured to carry respective control signals that, depending on the collective state of the control signals over time (e.g., logic high or logic low digital signals, or an array of analog voltages), electronically activate a particular configuration of the receive antenna 26, the particular configuration describing a particular receive-beam position, receive-beam side-lobe level, receive-beam HPBW, etc. And by changing the configuration of the receive antenna 16 over time, the radar system can steer the receive beam by sequencing the beam through a series of positions.

Moreover, if the receive antenna 16 includes multiple ESAs, then these multiple ESAs may be configured to work together by the radar system coordinating and synchronizing the configurations sent via the respective control lines 23.

Consequently, the transmit/receive antenna array 10 includes only two antenna channels, one RF channel 18 for the transmit antenna 14, and another RF channel 24 for the receive antenna 16. That is, the radar system 12 is configured to generate, and to provide to the transmit antenna 14, a single transmit single, and is configured to receive from the receive antenna 16, and to provide to the DBF circuitry (not shown in FIG. 1), a single receive single.

As described below, by orienting the transmit and receive antennas 14 and 16 approximately orthogonal to one another such that one of the antennas (e.g., the transmit antenna 14 in FIG. 1) is wider in the AZ dimension and the other antenna (e.g., the receive antenna 16 in FIG. 1) is taller in the EL dimension, the transmit/receive antenna array 10 can generate effective main transmit and main receive beams having narrower HPBWs in both AZ and EL than can the transmit antenna 14 or the receive antenna 16 alone. For example, the one of the antennas wider in the AZ dimension can be configured to provide fine AZ resolution (sometimes called "discrimination") and coarse EL resolution, and the other of the antennas taller in the EL dimension can be configured to provide fine EL resolution and coarse AZ resolution, such that the combination of the transmit and receive antennas 14 and 16 is configured to provide a fine resolution in both the AZ and EL dimensions.

Therefore, the transmit/receive antenna array 10 can achieve, in both AZ and EL, a Rayleigh resolution that is significantly higher than a conventional antenna can achieve with a same number (two in the above-described example) of antenna channels.

Still referring to FIG. 1, alternate embodiments of the transmit/receive antenna array 10 and radar subsystem 12 are contemplated. For example, the antenna array 10 and the radar subsystem 12 can include one or more additional components not described above, and can omit one or more of the above-described components. Furthermore, embodiments described below in conjunction with FIGS. 2-12 may apply to the radar subsystem 12.

Figure 2:
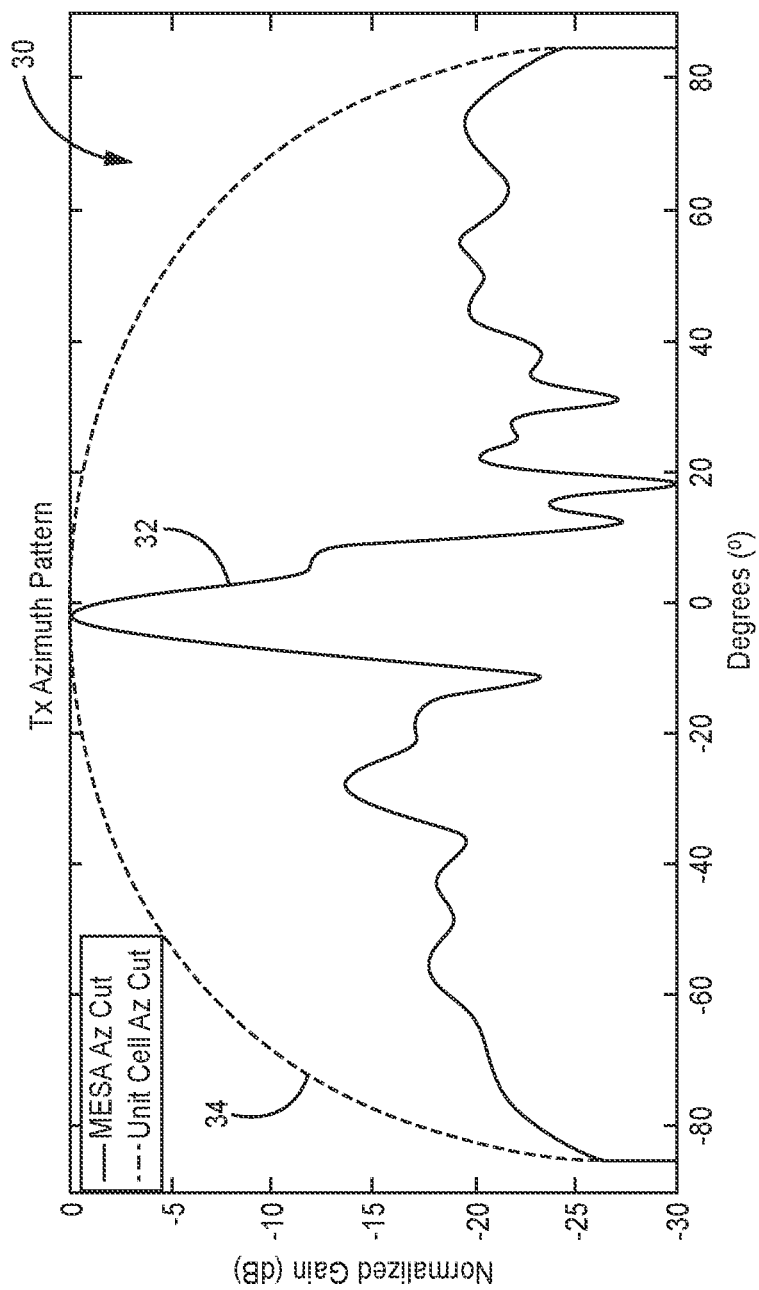
FIG. 2 is a diagram of a beam pattern, in the AZ dimension, generated by the transmit antenna of FIG. 1, according to an embodiment.

FIG. 2 is a diagram of a beam pattern 30 that the transmit antenna 14 of FIG. 1 is configured to generate in the AZ dimension, where the beam pattern includes a main transmit beam 32 at 0° in the AZ dimension, according to an embodiment. An envelope 34 of the AZ beam pattern 30 is approximately the same as the beam pattern of each activated, energized, or "on" antenna cell (not shown in FIG. 2) of the transmit antenna 14. Furthermore, the envelope 34 defines a half-power (−3 dB) FOV in the AZ dimension of approximately 70° (±35°), and the main transmit beam 32 has an HPBW of approximately 5° (±2.5°).

Still referring to FIG. 2, alternate embodiments of the beam pattern 30 are contemplated. For example, embodiments described above in conjunction with FIG. 1 and below in conjunction with FIGS. 3-12 may apply to the beam pattern 30.

Figure 3:
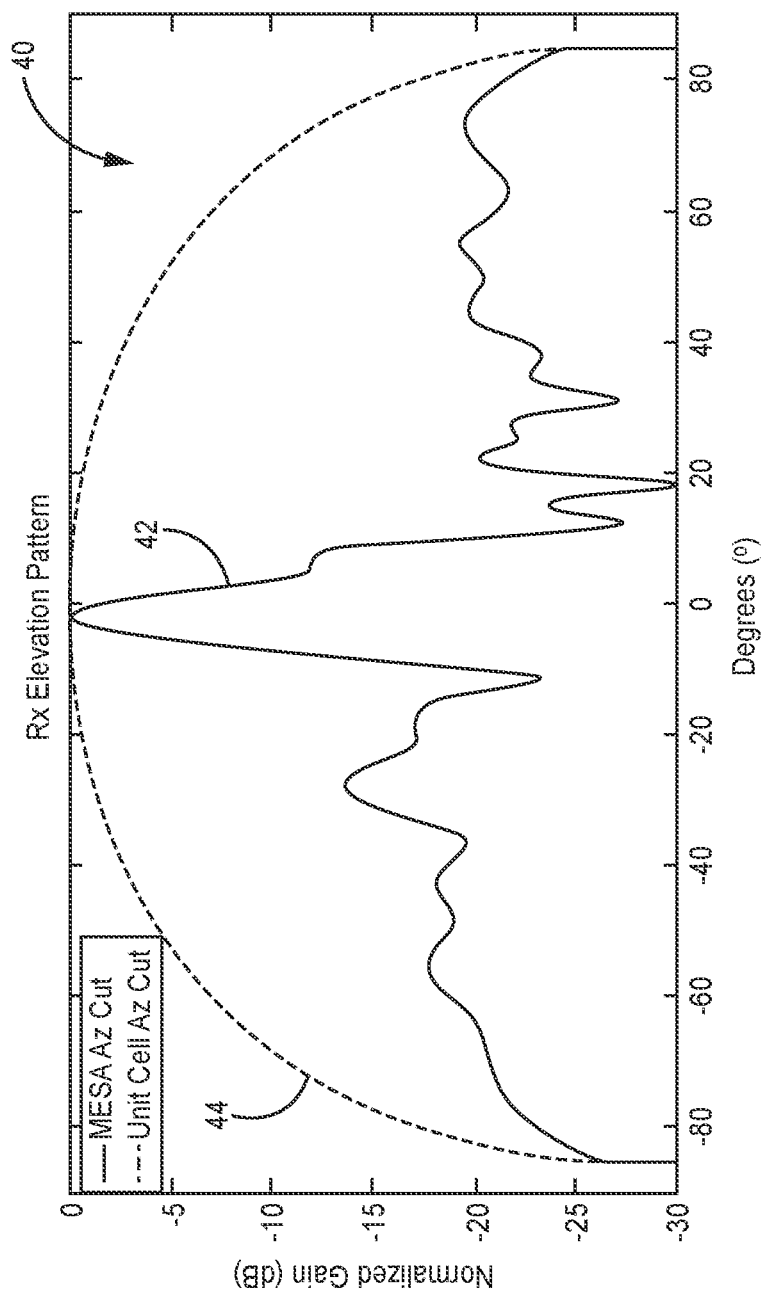
FIG. 3 is a diagram of a beam pattern, in the EL dimension, generated by the receive antenna of FIG. 1, according to an embodiment.

FIG. 3 is a diagram of a beam pattern 40 that the receive antenna 16 of FIG. 1 is configured to generate in the EL dimension, where the beam pattern includes a main receive beam 42 at 0° in the EL dimension, according to an embodiment. An envelope 44 of the EL beam pattern 40 is approximately the same as the beam pattern of each activated, energized, or "on" antenna cell (not shown in FIG. 3) of the receive antenna 16. Furthermore, the envelope 44 defines a half-power (−3 dB) FOV in the EL dimension of approximately 70° (±35°), and the main receive beam 42 has an HPBW of approximately 5° (±2.5°).

Still referring to FIG. 3, alternate embodiments of the beam pattern 40 are contemplated. For example, embodiments described above in conjunction with FIGS. 1-2 and below in conjunction with FIGS. 4-12 may apply to the beam pattern 40.

Referring to FIGS. 2-3, because, in an embodiment, the transmit antenna 14 and the receive antenna 16 have similar structures but are arranged orthogonal to one another, the AZ beam pattern 30, which the transmit antenna 14 is configured to generate for a main transmit beam 32 at 0° is approximately the same as the EL beam pattern 40, which the receive antenna 16 is configured to generate for a main receive beam 42 at 0°. And the AZ beam pattern that the transmit antenna 14 is configured to generate for a main transmit beam at any arbitrary beam angle is approximately the same as the EL beam pattern that the receive antenna 16 is configured to generate for a main receive beam at the same arbitrary beam angle.

Referring to FIGS. 1-3, operation of the transmit antenna 14 and of the receive antenna 16 is described, according to an embodiment.

Circuitry (not shown in FIGS. 1-3) of the radar system 12 generates, and the amplifier 20 amplifies, an RF transmit signal (also called an RF reference wave), and provides the RF transmit signal to the transmit antenna 14.

The radar-system circuitry (not shown in FIGS. 1-3) selectively activates one or more of the antenna cells, and deactivates the other antenna cells, of the transmit antenna 14 by driving appropriate signals onto the control lines 22. For example, to activate an antenna cell, the circuitry may drive a positive voltage (e.g., 1.0 Volts (V), 3.3 V, 12.0 V) onto the respective control line 22 coupled to the antenna cell, and to deactivate the antenna cell, the circuitry may drive a zero or negative voltage (e.g., −1.0 V, −3.3 V, −12.0 V) onto the respective control line.

The circuitry (not shown in FIGS. 1-3) activates and deactivates the antenna cells of the transmit antenna 14 according to a pattern that has been previously determined to generate a transmit beam pattern having a main beam with corresponding characteristics. For example, referring to FIG. 2, one such pattern of activated and deactivated antenna cells results in the transmit beam pattern 30 having the main beam 32 at approximately 0° with a HPBW of approximately 5° in AZ and a HPBW of approximate 50° in EL (the EL dimension is not shown in FIG. 2), and with no side lobe having a power that is higher than approximately −14 dB relative to the power of the main beam 32. Furthermore, referring to FIG. 2, the AZ beam pattern 30 has an AZ envelope that is the same as the AZ beam pattern of a single antenna cell of the transmit antenna 14.

By changing the pattern of activated and deactivated antenna cells of the transmit antenna 14, the circuitry can change the direction of the main transmit beam, and, therefore, can steer the main transmit beam back and forth across a FOV in any suitable steering or scan pattern (e.g., in an ordered pattern such as raster scan or conical scan, in a disordered pattern such as a Hadamard scan, random scan, or pseudo-random scan, or in a dynamically or intelligently sequenced pattern such as a task-able illumination scan or prioritized FOV time-weighting scan).

Still referring to FIGS. 1-3, the circuitry also selectively activates one or more of the antenna cells, and deactivates the other antenna cells, of the receive antenna 16 by driving appropriate signals onto the control lines 23. For example, to activate an antenna cell, the circuitry may drive a positive voltage (e.g., 1.0 V, 3.3 V, 12.0V) onto the respective control line 23 coupled to the antenna cell, and to deactivate the antenna cell, the circuitry may drive a zero or negative voltage (e.g., −1.0 V, −3.3 V, −12.0 V) onto the respective control line.

The circuitry activates and deactivates the antenna cells of the receive antenna 16 according to a pattern that has been previously determined to generate a receive beam pattern having a main beam with corresponding characteristics. For example, referring to FIG. 3, one such pattern of activated and deactivated antenna cells results in the receive beam pattern 40 having the main beam 42 at approximately 0° with a HPBW of approximately 5° in EL and a HPBW of approximate 50° in AZ (the AZ dimension is not shown in FIG. 3), and with no side lobe having a power that is higher than approximately −14 dB relative to the power of the main beam 42. Furthermore, referring to FIG. 3, the EL beam pattern 40 has an EL envelope that is the same as the EL beam pattern of a single antenna cell of the receive antenna 16.

By changing the pattern of activated and deactivated antenna cells of the receive antenna 16, the circuitry can change the direction of the main receive beam, and, therefore, can steer the main receive beam back and forth across a FOV in any suitable steering or scan pattern (e.g., in an ordered pattern such as raster scan or conical scan, in a disordered pattern such as a Hadamard scan or random scan, or in a dynamically or intelligently sequenced pattern such as a task-able illumination scan or prioritized FOV time-weighting scan).

The activated antenna cells of the receive antenna 16 collectively generate an RF signal from a received signal, which includes a portion of the transmit beam redirected by one or more objects, and the amplifier 26 amplifies this RF signal and provides it to circuitry (not shown in FIGS. 1-3) of the radar system 12 for processing and analysis.

FIG. 4 is a diagram of a beam pattern 60 that the transmit array 14 of FIG. 1 is configured to generate across a FOV 62, according to an embodiment. At the instant of time represented by FIG. 4, the transmit array 14 is generating a main transmit beam 64 having an HPBW in EL of approximately 50° and an HPBW in AZ of approximately 5°. Because the main transmit beam 64 is so much wider in EL than it is in AZ, it can be called a "fan" transmit beam.

FIG. 5 is a diagram of a beam pattern 70 that the receive array 16 of FIG. 1 is configured to generate across the same FOV 62 as in FIG. 4, according to an embodiment. At the instant of time represented by FIG. 5, which is the same instant of time represented by FIG. 4, the receive array 16 is generating a main receive beam 72 having an HPBW in EL of approximately 5° and an HPBW in AZ of approximately 50°. Because the main receive beam 72 is so much wider in AZ than it is in EL, it can be called a "fan" receive beam.

FIG. 6 is a diagram of a resulting beam pattern 80, which is the combination of the transmit and receive beam patterns 64 of FIG. 4 and 70 of FIG. 5 across the FOV 62 at the same instant of time represented by FIGS. 4-5, according to an embodiment. The resulting beam pattern 80 is effectively the overlap (mathematically, the product) of the transmit beam pattern 60 and the receive beam pattern 70. Therefore, at the instant of time represented by FIGS. 4-6, the transmit antenna 14 and the receive antenna 16 effectively are generating a resulting, main transmit/receive beam 82 having an HPBW in EL of approximately 5° and an HPBW in AZ of approximately 5°. That is, the transmit antenna 14 and the receive antenna 16 combine to generate, effectively, both a transmit beam having a 5° HPBW in both AZ and EL and a receive beam having a 5° HPBW in both AZ and EL. Said another way and as shown in FIG. 6, the transmit and receive fan beams 64 and 72 overlap and form a pseudo cross, and the resulting beam 82 is the portion of the ross where the two fan beams intersect. Although the main transmit beam 64 contains energy across its entire height in EL, the main receive beam 72 receives only the portion of this energy at the intersection of the pseudo cross, and effectively rejects the energy in the other portions of the main transmit beam.

That is, the main receive beam 72 effectively spatially filters the main transmit beam 64. Comparatively, to achieve a same effective beam width as the antenna array 10 of FIG. 1, a conventional antenna array would need transmit and receive antennas that were each capable of generating, independently, a beam having a 5° HPBW in both AZ and EL. But the transmit and receive antennas of such a conventional antenna array would need to be significantly larger in area so as to have a significantly larger aperture, and would need to include more antenna channels, than the transmit and receive antennas 14 and 16 of FIG. 1. Consequently, the antenna array 10 of FIG. 1 can provide similar levels of Rayleigh resolution and other performance parameters as can a conventional antenna array, but at a significantly reduced C-SWAP parameters (cost, size, weight, and power consumption) and complexity.

Referring to FIGS. 1 and 4-6, operation of the antenna array 10 and the radar system 12 are described, according to an embodiment.

Circuitry (not shown in FIGS. 1 and 4-6) of the radar system 12 generates, and drives the transmit antenna 14 with, an RF signal via the channel input 18.

The circuitry also selectively activates one or more of the antenna cells of the transmit antenna 14, and deactivates the other antenna cells, by driving appropriate signals onto the control lines 22.

The circuitry activates and deactivates the antenna cells of the transmit antenna 14 according to a pattern that has been previously determined to steer the main transmit beam 64 in the AZ dimension from a first side (e.g., the left side) of the FOV 62 to a second side (e.g., the right side) of the FOV. For example, the circuitry is configured to steer the main transmit beam 64 in increments, such as in increments of approximately 1° in the AZ dimension.

At the same time that the circuitry is steering the main transmit beam 64 from the first side of the FOV 62 to the second side of the FOV, the circuitry activates and deactivates the antenna cells of the receive antenna 16 according to a pattern that has been previously determined to maintain the main receive beam 72 at a stationary position in the EL dimension. That is, while the circuitry steers the main transmit beam 64 from the first side of the FOV 62 to the second side of the FOV, the circuitry maintains the receive beam 72 in a single position in the EL dimension between a first end (e.g., the top) and a second end (e.g., the bottom) of the FOV. The receive antenna 16 generates and outputs, via the channel 24, an RF signal in response to energy that the receive array receives along the effective resulting beam 82—this energy is, ideally, in the form of a signal that is a portion of the main transmit beam 64 redirected by one of more objects within the FOV 62.

In response to the main transmit beam 64 reaching the second side of the FOV 62, the circuitry steers the main transmit beam in the opposite direction back toward the first side of the FOV by stepping the position of the main transmit beam in increments of approximately 1° in the AZ dimension.

Also in response to the main transmit beam 64 reaching the second side of the FOV 62, the circuitry increments the main receive beam 72 one predetermined position (e.g., 1°) in a direction (e.g., up or down) in the EL dimension.

The circuitry continues steering the main transmit and receive beams 64 and 72 in this manner until the main receive beam is at a first end (e.g., the top end) of the FOV 62.

In response to the main receive beam 72 reaching a first end (e.g., top end) of the FOV 62, the circuitry steers the main receive beam in the opposite direction back toward the second end (e.g., bottom end) of the FOV.

The circuitry continues the above procedure until the circuitry effectively steers the resulting transmit/receive beam 82 over the entire FOV 62.

Next, the circuitry continues the above procedure for as long as it is instructed (e.g., by a controller of the radar system 12) to steer, effectively, the resulting transmit/receive beam 82 over the FOV 62.

Still referring to FIGS. 1 and 4-6, alternate embodiments of the radar system 12 are contemplated. For example, instead of holding the main receive beam 72 stationary in the EL dimension while steering the main transmit beam 64 across the FOV 62 in the AZ dimension, the circuitry of the radar system 12 can hold the main transmit beam stationary in the AZ dimension while steering the main receive beam across the FOV in the EL dimension. Furthermore, the circuitry of the radar system 12 can steer the main transmit beam 64 and the main receive beam 72 back and forth across the FOV 62 in any suitable steer or scan pattern (e.g., in an ordered pattern such as raster scan or conical scan, in a disordered pattern such as a Hadamard scan or random scan, or in a dynamically or intelligently sequenced pattern such as a task-able illumination scan or prioritized FOV time-weighting scan). For example, the circuitry may steer one of the main beams 64 and 72 only partially across the FOV 62 in one dimension before steering the other one of the main beams in the other dimension. Furthermore, the radar subsystem 12 can include one or more additional components not described above, and can omit one or more of the above-described components. Moreover, embodiments described above in conjunction with FIGS. 1-5 and below in conjunction with FIGS. 7-12 may apply to the radar subsystem 12.

Figure 7:
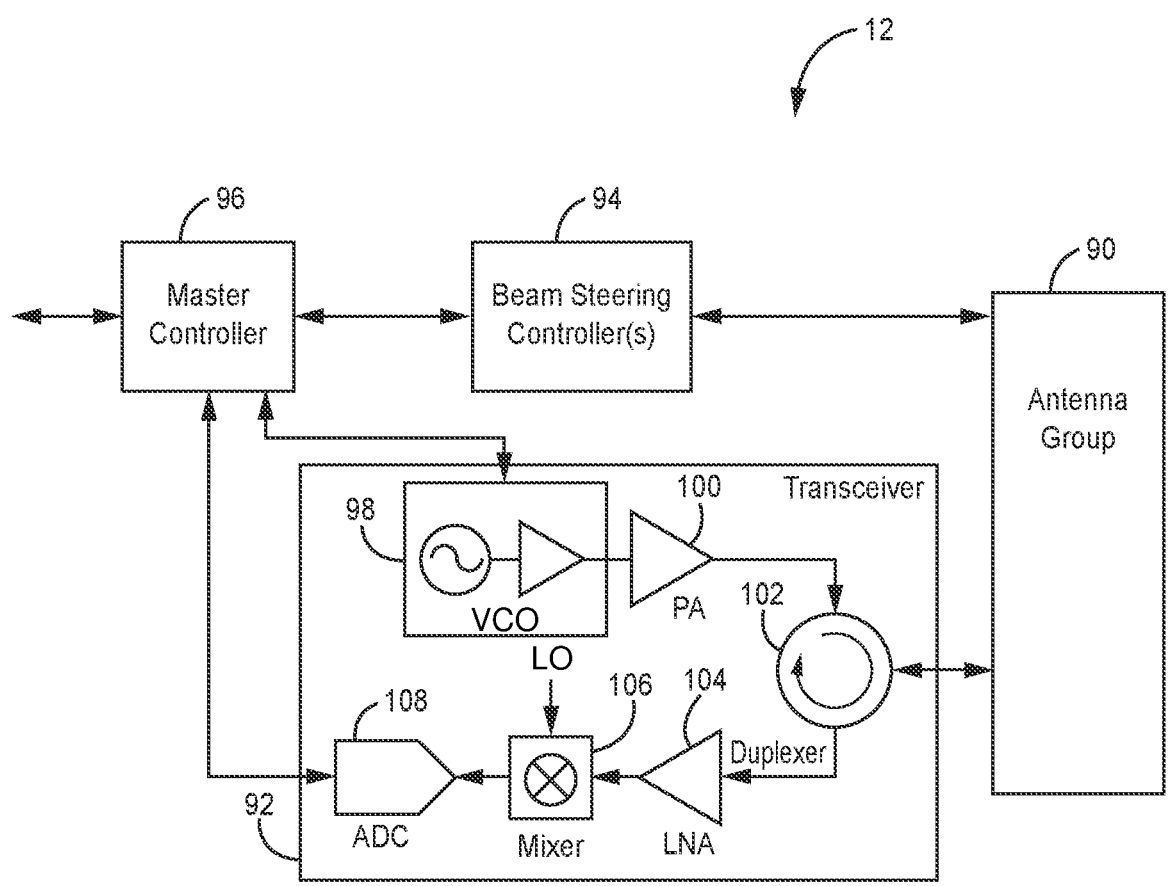
FIG. 7 is a diagram of a radar subsystem that includes at least one antenna array of FIG. 1, according to an embodiment.

FIG. 7 is a block diagram of the radar subsystem 12, which includes one or more of the antenna array 10 of FIG. 1, according to an embodiment.

The radar system 12 includes an antenna group 90, a transceiver 92, a beam-steering controller 94, and a master controller 96. The antenna group 90 includes the one or more of the antenna array 10 of FIG. 1.

The transceiver 92 includes a voltage-controlled oscillator (VCO) 98, a preamplifier (PA) 100, a duplexer 102, a low-noise amplifier (LNA) 104, a mixer 106, and an analog-to-digital converter (ADC) 108. The VCO 98 is configured to generate a reference signal having a frequency $f_0=c/\lambda_0$, which is the frequency for which at least one of the antennas of the antenna group 90 is designed (for example, the antenna group 90 is configured for operation in air). The PA 100 is configured to amplify the VCO signal, and the duplexer 102 is configured to couple a reference signal to the antennas of the antenna group 90, via one or more signal feeders (not shown in FIG. 7), as transmit versions of respective reference waves. One or both of the duplexer 102 and antenna group 90 can include one or more of the signal feeders. The duplexer 102 is also configured to receive receive versions of respective reference waves from the antennas of the antenna group 90, and to provide these receive versions of the respective reference waves to the LNA 104, which is configured to amplify these received signals. The mixer 106 is configured to shift the frequencies of the amplified received signals down to a base band, and the ADC 108 is configured to convert the down-shifted analog signals to digital signals for processing by the master controller 96.

The beam-steering controller 94 is configured to steer the beams (both transmit and receive beams) generated by the one or more antennas of the antenna group 90 by generating the control signals to the control ports 22 and 23 (FIG. 1) of the antenna array 10 as a function of time and main-beam position. By appropriately generating the control signals, the beam-steering controller 94 is configured to selectively activate and deactivate the antenna elements of the antenna array 10 according to selected spatial and temporal patterns.

The master controller 96 is configured to control the transceiver 92 and the beam-steering controller 94, and to analyze the digital signals from the ADC 108. For example, assuming that the one or more antennas of the antenna group 90 are designed to operate at frequencies in a range centered about $f_0$, the master controller 96 is configured to adjust the frequency of the signal generated by the VCO 98 for, e.g., environmental conditions such as weather, the average number of objects in the range of the one or more antennas of the antenna assembly, and the average distance of the objects from the one or more antennas, and to conform the signal to spectrum regulations. Furthermore, the master controller 96 is configured to analyze the signals from the ADC 108 to, e.g., identify a detected object, and to determine what action, if any, that a system including, or coupled to, the radar subsystem 12 should take. For example, if the system is a self-driving vehicle or a self-directed drone, then the master controller 96 is configured to determine what action (e.g., braking, swerving), if any, the vehicle should take in response to the detected object.

Operation of the radar subsystem 12 is described below, according to an embodiment. Any of the system components, such as the master controller 96, can store in a memory, and execute, software/program instructions to perform the below-described actions. Alternatively any of the system components, such as a system controller (not shown in FIG. 7), can store, in a memory, firmware that when loaded configures one or more of the system components to perform the below-described actions. Or any of the system components, such as the system controller, can be hardwired to perform the below-described actions.

The master controller 96 generates a control voltage that causes the VCO 98 to generate a reference signal at a frequency within a frequency range centered about $f_0$. For example, $f_0$ can be in the range of approximately 5 Gigahertz (GHz)-110 GHz.

The VCO 98 generates the signal, and the PA 100 amplifies the signal and provides the amplified signal to the duplexer 102.

The duplexer 102 further amplifies the signal, and couples the further-amplified signal to the one or more antennas 10 of the antenna group 90 as a respective transmit version of a reference wave.

While the duplexer 102 is coupling the signal to the one or more antennas 10 of the antenna group 90, the beam-steering controller 94, in response to the master controller 96, is generating control signals to the one or more transmit antennas 14 of the one or more antennas 10. These control signals cause the one or more transmit antennas 14 to generate and to steer one or more main signal-transmission beams. The control signals cause the one or more main signal-transmission beams to have desired characteristics (e.g., phase, amplitude, polarization, direction, half-power beam width (HPBW)), and also cause the side lobes to have desired characteristics such as suitable total side-lobe power and a suitable side-lobe level (e.g., a difference between the magnitudes of a smallest main signal-transmission beam and the largest side lobe).

Then, the master controller 96 causes the VCO 98 to cease generating the transmit version of the reference signal.

Next, while the VCO 98 is generating no reference signal, the beam-steering controller 94, in response to the master controller 96, generates control signals to the one or more receive antennas 16 of the one or more antennas 10. These control signals cause the one or more receive antennas 16 to generate and to steer one or more main signal-receive beams. The control signals cause the one or more main signal-receive beams to have desired characteristics (e.g., phase, amplitude, polarization, direction, half-power beam width (HPBW)), and also cause the side lobes to have desired characteristics such as suitable total side-lobe power and a suitable side-lobe level. Furthermore, the beam-steering controller 94 can generate the same sequence of control signals for steering the one or more main signal-receive beams as it does for steering the one or more main signal-transmit beams.

Then, the duplexer 102 couples receive versions of reference waves respectively generated by the one or more receive antennas 16 of the antenna group 90 to the LNA 104.

Next, the LNA 104 amplifies the received signals.

Then, the mixer 106 down-converts the amplified received signals from a frequency, e.g., at or near $f_0$, to a baseband frequency.

Next, the ADC 108 converts the analog down-converted signals to digital signals.

Then, the master system controller 96 analyzes the digital signals to obtain information (e.g., the location of an object detected by the master system controller) from the signals and to determine what, if anything, should be done in response to the information obtained from the signals.

The master system controller 96 can repeat the above cycle one or more times.

Still referring to FIG. 7, alternate embodiments of the radar subsystem 12 are contemplated. For example, the radar subsystem 12 can include one or more additional components not described above, and can omit one or more of the above-described components. Furthermore, the beam-steering controller(s) 94 and the master controller 96 can form part of a controller circuit. Moreover, embodiments described above in conjunction with FIGS. 1-6 and below in conjunction with FIGS. 8-12 may apply to the radar subsystem 12.

Figure 8:
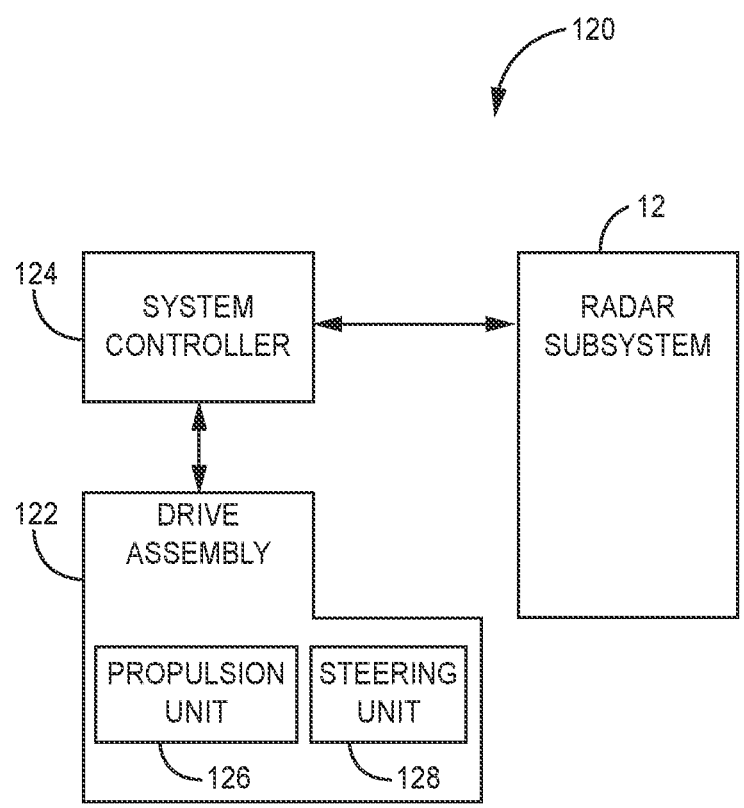
FIG. 8 is a diagram of a system that includes one or more of the radar subsystem of FIG. 7, according to an embodiment.

FIG. 8 is a block diagram of a system, such as a vehicle system 120, which includes one or more of the radar subsystem 12 of FIG. 7, according to an embodiment. For example, the vehicle system 120 can be an unmanned aerial vehicle (UAV) such as a drone, or a self-driving (autonomous) car.

In addition to the radar subsystem(s) 12, the vehicle system 120 includes a drive assembly 122 and a system controller 124.

The drive assembly 122 includes a propulsion unit 126, such as an engine or motor, and includes a steering unit 128, such as a rudder, flaperon, pitch control, or yaw control (for, e.g., an UAV or drone), or a steering wheel linked to steerable wheels (for, e.g., a self-driving car).

The system controller 124 is configured to control, and to receive information from, the radar subsystem 12 and the drive assembly 122. For example, the system controller 124 can be configured to receive locations, sizes, and speeds of nearby objects from the radar subsystem 12, and to receive the speed and traveling direction of the vehicle system 120 from the drive assembly 122.

Operation of the vehicle system 120 is described below, according to an embodiment. Any of the system components, such as the system controller 124, can store in a memory, and execute, software/program instructions to perform the below-described actions. Alternatively any of the system components, such as the system controller 124, can store, in a memory, firmware that when loaded configures one or more of the system components to perform the below-described actions. Or any of the system components, such as the system controller 124, can be circuitry hardwired to perform the below-described actions.

The system controller 124 activates the radar subsystem 12, which, as described above in conjunction with FIGS. 1-6, provides to the system controller information regarding one or more objects in the vicinity of the vehicle system 120. For example, if the vehicle system 120 is an UAV or a drone, then the radar subsystem can provide information regarding one or more objects (e.g., birds, aircraft, and other UAVs/drones), in the flight path to the front, sides, and rear of the UAV/drone. Alternatively, if the vehicle system 120 is a self-driving car, then the radar subsystem 260 can provide information regarding one or more objects (e.g., other vehicles, debris, pedestrians, bicyclists) in the roadway or out of the roadway to the front, sides, and rear of the vehicle system.

In response to the object information from the radar subsystem 12, the system controller 124 determines what action, if any, the vehicle system 120 should take in response to the object information. Alternatively, the master controller 96 (FIG. 7) of the radar subsystem can make this determination and provide it to the system controller 124.

Next, if the system controller 124 (or master controller 96 of FIG. 7) determined that an action should be taken, then the system controller causes the drive assembly 122 to take the determined action. For example, if the system controller 124 or master controller 96 determined that a UAV system 120 is closing on an object in front of the UAV system, then the system controller 124 can control the propulsion unit 126 to reduce air speed. Or, if the system controller 124 or master controller 96 determined that an object in front of a self-driving system 120 is slowing down, then the system controller 124 can control the propulsion unit 126 to reduce engine speed and to apply a brake. Or if the system controller 124 or master controller 96 determined that evasive action is needed to avoid an object (e.g., another UAV/drone, a bird, a child who ran in front of the vehicle system) in front of the vehicle system 120, then the system controller 124 can control the propulsion unit 126 to reduce engine speed and, for a self-driving vehicle, to apply a brake, and can control the steering unit 128 to maneuver the vehicle system away from or around the object.

Still referring to FIG. 8, alternate embodiments of the vehicle system 120 are contemplated. For example, the vehicle system 120 can include one or more additional components not described above, and can omit one or more of the above-described components. Furthermore, the vehicle system 120 can be a vehicle system other than a UAV, drone, or self-driving car. Other examples of the vehicle system 120 include a watercraft, a motor cycle, a car that is not self-driving, and a spacecraft. Moreover, a system including the radar subsystem 12 can be other than a vehicle system. Furthermore, embodiments described above in conjunction with FIGS. 1-7 and below in conjunction with FIGS. 9-12 may apply to the vehicle system 120 of FIG. 8.

Figure 9:
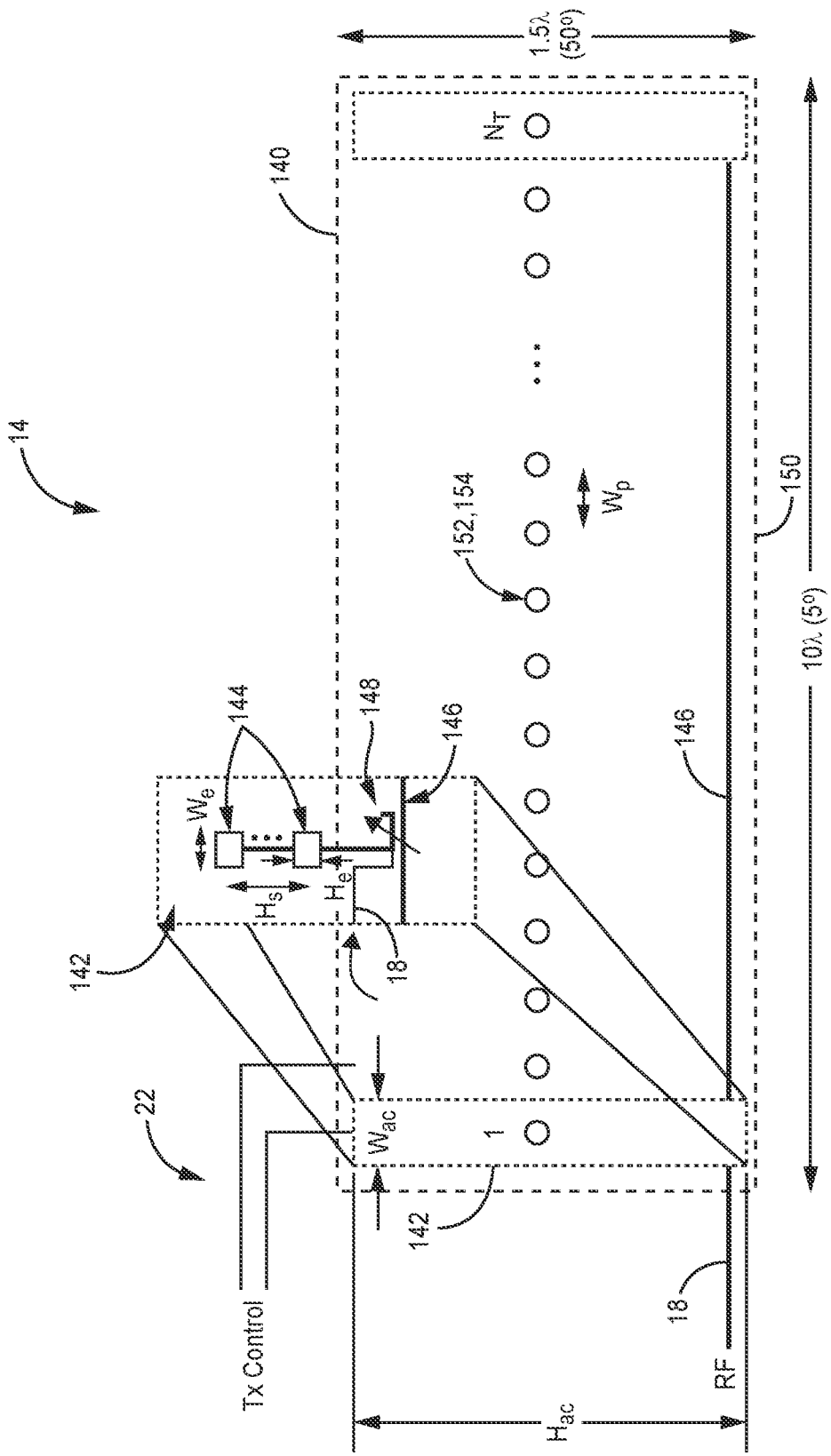
FIG. 9 is a diagram of the transmit antenna section of FIG. 1 (and possible of the receive antenna section of FIG. 1, according to an embodiment.

FIG. 9 is a diagram of the SIMO transmit antenna section 14 of FIG. 1, according to an embodiment in which the antenna section includes a single conductive layer. The single conductive layer can be the topmost layer, or other upper layer, of the antenna section 14.

The transmit antenna section 14 further includes, in the single conductive layer, an array 140 of antenna cells 142

(also called unit cells, antenna units, or antenna segments), each of which includes one or more respective antenna elements 144. In an embodiment, the transmit antenna section 14 includes one row, and multiple ($N_T$) columns, of antenna cells 142, although in other embodiments the transmit antenna section can include more than one row of antenna cells and one, or otherwise fewer than $N_T$, columns. As described below, because the antenna section 14 includes more columns of controllable antenna cells 142 than rows, the resolution at which the radar system 12 can steer a beam in the AZ dimension is significantly higher than the resolution at which the radar system can steer the beam in the EL dimension. Therefore, although the beam-steering resolution and FOV in the AZ dimension of the transmit antenna section 14 approaches the beam-steering resolution and FOV in the AZ dimension of a fully 2D array of antenna elements, the beam-steering resolution and FOV in the EL dimension of the antenna section 14 are significantly smaller/lower than the beam-steering resolution and FOV in the EL dimension of a fully 2D antenna array. But within this smaller FOV, the performance of the antenna section 14 can approach, and even equal, the performance of a fully 2D antenna array having antenna cells of the same size and AZ-dimension spacing as the antenna cells 142 of the transmit antenna section 14.

The antenna section 14 also includes, in the single conductive layer, a transmission medium, here an RF feed 146, which is coupled to the RF channel input 18 (or to the output of the amplifier 20 of FIG. 1 if the amplifier is included), which is disposed along an edge 150 of the antenna section, which is configured to distribute an RF transmit reference wave across the antenna section, and which is, therefore, common to all of the antenna cells 142. That is, the RF feed 146 distributes the RF transmit reference wave from the channel input 18 to all of the antenna cells 142. Examples of the RF feed 146 include the following transmission-line structures, with or without a dielectric superstrate: a transmission line, a co-planar waveguide (CPW), a co-planar grounded waveguide (CPGW), a microstrip, a strip line, and a slot line. Furthermore, a connecting structure (e.g., a coaxial cable and a coaxial-cable connector) couples the RF transmit reference wave from the radar-system circuitry to the RF feed 146 at a feed edge (the leftmost edge in FIG. 9) of the transmit antenna section 14 such that the RF transmit reference wave propagates along the RF feed from the feed edge to an opposite, i.e., signal-termination, edge (the rightmost edge in FIG. 9) of the antenna section. Alternatively, the RF transmit reference wave can be fed to the RF feed 146 at any point (i.e., center fed) such that the RF transmit reference wave propagates along the RF feed from the feed point in both directions (leftward and rightward in FIG. 9) to the signal-termination edges (left and right edges in FIG. 9) of the transmit antenna section 14. Or, the RF feed 146, or other transmission medium, can be located in any suitable location within the transmit antenna section 14, and can include one or more feed points at any suitable one or more locations such that the RF transmit reference wave propagates along the transmission medium outward from the one or more feed points to one or more of the edges of the antenna section.

Furthermore, each antenna cell 142 includes a respective coupling device, here a feed coupler 148, having all of its conductive components in the single conductive layer, and includes one or more antenna elements 144 serially coupled to one or both sides of the feed coupler. For example, as shown in FIG. 9, a group of serially coupled antenna elements 144 is serially coupled to only one side of the feed coupler 148 because the RF feed 146 is disposed along an edge of the antenna section 14. Because the antenna section 14 includes only one respective feed coupler 148 for each antenna cell 142 regardless of how many antenna elements 144 are in each antenna cell, the sizes of the antenna cells can be shrunk as needed to accommodate an increased operational frequency without exceeding the maximum feed-coupler density of the antenna section. That is, including fewer than one feed coupler 148 per antenna element 144 can allow an increase in the operating frequency of the antenna section 14 as compared to a fully 2D antenna section.

The feed coupler 148 of each antenna cell 142 is coupled to a respective one of the control lines 22, and is configured to couple, or is configured to cause the coupling of, the RF transmit reference wave propagating along the RF feed 146 to the antenna elements 144 according to any conventional coupling methodology that may imply native polarization of each antenna cell, and therefore, that may imply native polarization of the entire antenna section 14. Examples of suitable coupling methodologies include magnetic-coupled edge feed, electric-coupled edge feed, series feed, and corporate feed. For example, in the described embodiment, the feed coupler 148 is located along the edge 150 of the antenna section 14 adjacent to the RF feed 146, and can be configured according to any of the above-described coupling methodologies. Alternatively, the feed coupler 148 can be located at a phase center 152 of the respective antenna cell 142 and can be configured according to any of the above-described coupling methodologies, and the RF feed 146 can extend adjacent to the phase centers of the antenna cells. The phase center 152 is the electrical center of the antenna cell 142, and the electrical center is the point at the center of a sphere having a surface where the far-field radiation pattern of the antenna cell has the same signal phase at all points on the surface. Although the phase centers 152 are shown as being located at the geometrical centers 154 of the respective antenna cells 142, one or more of the phase centers can be located off geometrical center of the respective one or more antenna cells.

Furthermore, the feed coupler 148 can be any conventional device or structure (e.g., a diode) that is configured to couple, or that is configured to cause the coupling of, the RF transmit reference wave propagating along the RF feed 146 to the antenna elements 144 of the antenna cell 142. For example, the feed coupler 148 can include a transmissive-type switch that is in-line (i.e., in electrical series) between the RF feed 146 and the antenna elements 144 and that has an impedance (i.e., signal-coupling level) that the control signal on the control line 22 can select (e.g., the first state of binary control signal can cause the feed coupler to have a low-impedance or "on" state, and the second state of the binary control signal can cause the feed coupler to have a high-impedance or "off" state). Furthermore, the feed coupler 148 can include a shunt (reflective)-type switch that is tangent to, in shunt with, or is otherwise adjacent to, the signal path between the RF feed 146 and the antenna elements 144 and that is configured to vary the impedance level, and, therefore, the signal-reflection/signal-coupling level, of the signal path in response to the level of the control signal on the control line 22. Moreover, the feed coupler 148 can include a resonant-type switch that is configured to control, in response to the control signal on the control line 22, a frequency at which the antenna cell 142 resonates. The closer the resonant frequency to the frequency of the RF transmit reference wave on the RF feed 146, the greater the coupling between the antenna cell and the RF feed; conversely, the farther the resonant frequency from the frequency of the RF reference wave, the lesser the coupling between the antenna cell and the RF feed. In addition, the feed coupler 148 can be configured to control, in response to the control signal on the control line 22, the dielectric properties of the antenna cell 142, or the dielectric properties of the coupling region between the RF feed 146 and the antenna cell, to adjust the coupling level between the antenna elements 144 and the RF feed.

Still referring to FIG. 9, each antenna element 144 has a width approximately equal to $W_e$, a height approximately equal to $H_e$, and is spaced approximately $H_s$ from adjacent antenna elements (or from the feed coupler 148), where $W_e$, $H_e$, and $H_s$ are all typically $<\lambda$, where $\lambda$ is the wavelength of the signal that the antenna element 144 is configured to transmit, for example, the wavelength of the transmit reference wave in the medium through which the antenna element 144 is configured to transmit a signal. Although $W_e$, $H_e$, and $H_s$ are described as being approximately uniform within each antenna cell 142 and from antenna cell to antenna cell, one or more of these dimensions can be non-uniform within an antenna cell or from antenna cell to antenna cell. For example, $W_e$, $H_e$, and $H_s$ can be approximately in the range $\lambda/10 < W_e$, $H_e$, $H_s \leq \lambda$. Furthermore, although the antenna elements 144 are described as being rectangular, the antenna elements can be of any shape, and can be formed from any material, that give advantageous element characteristics, for instance efficiency, gain, bandwidth, HPBW in AZ and in EL, etc. Moreover, the antenna elements 144 can include sub-elements, for example, in configurations such as a microstrip-fed patch array, coplanar waveguide (CPW) patch array, etc.

Furthermore, the horizontal centers 154 (the same points as the phase centers 152 in an embodiment) of the antenna cells 142 are spaced apart by approximately $0.01\lambda \leq W_p \leq 0.25\lambda$. And although $W_p$ is described as being uniform from antenna cell 142 to antenna cell, $W_p$ can be non-uniform.

Moreover, each antenna cell 142 can be described as having a width $W_{ac} \sim W_p$, and having a height of approximately $H_{ac}$, which is approximately the same as the height ($1.5\lambda$ in an embodiment) of the transmit antenna section 14.

Still referring to FIG. 9, alternate embodiments of the transmit antenna section 14 are contemplated. For example, although described as being a transmit antenna section, the antenna section 14 can also be configured, and can be operated, as a receive antenna section, such as the receive antenna section 16 of FIG. 1; or, the receive antenna section 16 can have a structure and configuration that is similar to the structure and configuration of the transmit antenna section 14. During a receive operation, the radar system 12 controls the antenna section 14 (or the similarly structured and configured receive antenna section 16) to form and steer a receive beam, and the active antenna units 142 each couple a respective received signal to the RF feed 24, which effectively adds together the received signals from the active antenna units to form a combined received signal, and which provides the combined received signal to the circuitry of the radar-system 12 (FIGS. 1 and 7-8) for processing. The radar system 12 can also include the amplifier 16 of FIG. 1, which amplifier is configured to amplify the combined received signal from the RF feed 24 and to provide the amplified signal to the radar-system circuitry. Furthermore, although described as including a single conductive layer, the antenna section 14 can include multiple conductive layers. For example, the RF feed 18 can be located in one or more layers of the transmit antenna section 14 that are below the layer(s) in which the feed coupler 148 is located, and the feed coupler can be located below the one or more layers in which the antenna elements 144 are located. Moreover, embodiments described above in conjunction with FIGS. 1-8 and below in conjunction with FIGS. 10-12 may apply to the transmit antenna section 14.

Figure 10:
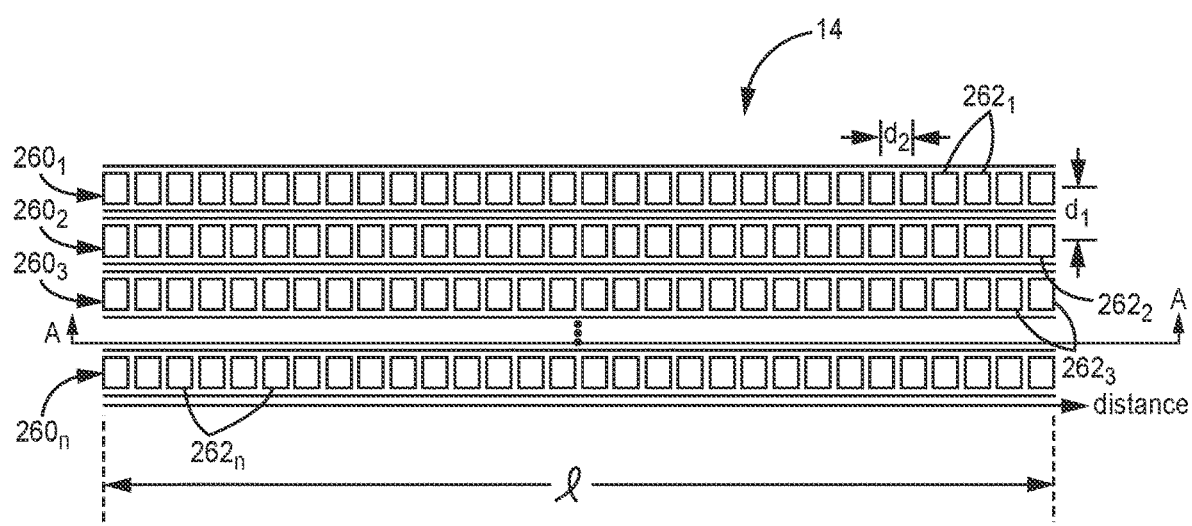
FIG. 10 is a plan view of the transmit antenna section of FIG. 1 (and possibly of the receive antenna section of FIG. 1), according to an embodiment.

FIG. 10 is a plan view of the transmit-antenna section 14 of FIG. 1 in which the transmit-antenna section is a holographic-aperture antenna section having multiple waveguides $260_1$-$260_n$ and corresponding rows if conductive antenna elements $262_1$-$262_m$ according to an embodiment. The waveguides 260 are conventional rectangular-strip transmission-line waveguides, only the top portions of which are visible in FIG. 10, and are approximately parallel to one another. The antenna elements $262_1$-$262_n$ are arranged over the waveguides 260 in respective one-dimensional rows (arrays). For example, the antenna elements $262_1$ are arranged in a one-dimensional array over the waveguide $260_1$, the antenna elements $262_2$ are arranged in a one-dimensional array over the waveguide $260_2$, and so on. Assuming that the transmit-antenna section 14 is designed to transmit and to receive signals at a wavelength of $\lambda_0$, the waveguides 260 are spaced apart from one another, on longitudinal center, by a distance $d_1 = \lambda_0/2$, and the antenna elements 262 within each one-dimensional array are spaced apart from one another by a distance $d_2 \ll \lambda_0$. For example, $\lambda_0/1000 < d2 < \lambda_0/10$. Furthermore, each of the waveguides 260 has approximately the same length l of between approximately $3\lambda_0$-$20\lambda_0$, or the length l can be even longer than $20\lambda_0$.

Figure 11:
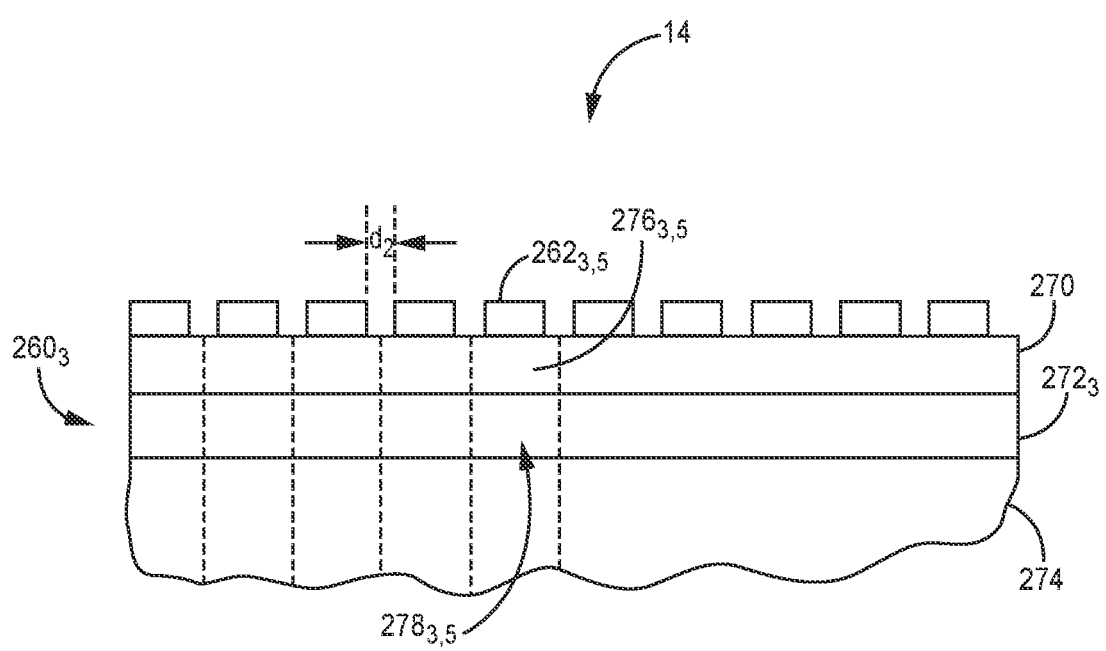
FIG. 11 is a side view of the transmit antenna section of FIG. 10, according to an embodiment.

FIG. 11 is a cut-away side view of the transmit antenna section 14 of FIG. 10, taken along line A-A of FIG. 10, according to an embodiment. Although only the waveguide $260_3$ and the corresponding antenna elements $262_3$ are shown in FIG. 11, the following discussion also applies to the other waveguides and antenna elements of the antenna section.

The waveguide $262_3$ includes a coupling layer 270 having an adjustable impedance about a frequency $f_0 = c/\lambda_0$, a conductive layer/strip $272_3$, and a dielectric layer 274, where c is the speed of light in free space. Although not shown, the transmit-antenna section 14 includes a conductive plane, such as a ground plane, disposed beneath the dielectric layer 274. In operation, a signal guided by the waveguide $260_3$ propagates along the dielectric layer 274 between the conductive strip $272_3$ and the ground plane. Although the transmit-antenna section 14 can include a single coupling layer 270 and a single dielectric layer 274 common to all of the waveguides 260, the antenna section includes separate conductive strips 272, one strip per waveguide. It is these strips 272, and the corresponding antenna elements 262, which are spaced apart by the distance $d_1$ (see FIG. 10).

Each antenna element $262_3$, and a coupling region $276_3$ of the layer 270 disposed below the antenna element, form a respective antenna unit $278_3$. For example, the antenna element $262_{3,5}$ and the coupling region $276_{3,5}$ of the layer 270 form an antenna unit $278_{3,5}$ of the transmit antenna-section 14.

Figure 12:
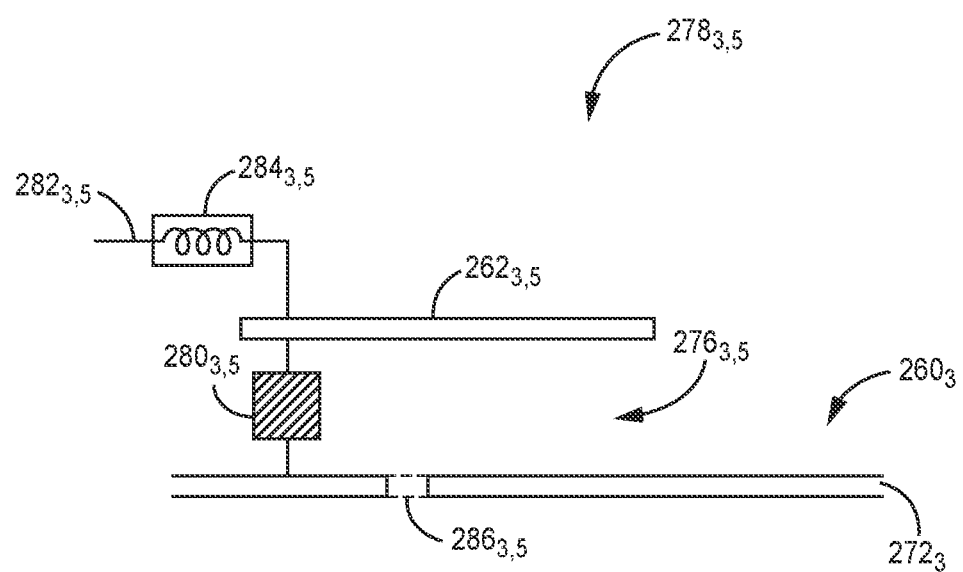
FIG. 12 is a side view and an electrical diagram of the transmit antenna section of FIGS. 10-11, according to an embodiment.

FIG. 12 is a side view and electrical diagram of the antenna unit $278_{3,5}$ of FIG. 11, and the portion of the conductive strip $272_3$ of the waveguide $260_3$ corresponding to the antenna unit, according to an embodiment.

The coupling region $276_{3,5}$ can be modeled as a lumped adjustable-impedance element $280_{3,5}$, which is electrically coupled between the conductive strip $272_3$ and the antenna element $262_{3,5}$. A conductive control line $282_{3,5}$ is directly coupled to the lumped element $280_{3,6}$, or is indirectly coupled to the lumped element via the conductive antenna element $262_{3,5}$ as shown. In a manner similar to that described above in conjunction with FIGS. 7 and 8, a controller circuit (e.g., the master controller 96 of FIG. 7) can selectively couple and uncouple the signal propagating along the waveguide $260_3$ to and from the antenna element $262_{3,5}$, and can thus selectively activate and deactivate the antenna element, by selectively changing the bias signal (e.g., a bias voltage) on the control line $282_{3,5}$. Furthermore, a low-pass filter $284_{3,5}$ can be serially coupled between the lumped element $280_{3,5}$ and the controller to uncouple, from the controller, high-frequency energy from the signal propagating along the waveguide $260_3$.

And the portion of the conductive strip $272_3$ corresponding to the antenna unit $278_{3,5}$ includes a gap $286_{3,5}$, which can be filled with that same material that forms the coupling layer 270, and which is configured to couple the signal propagating along the waveguide $260_3$ to the antenna unit.

Still referring to FIG. 12, during operation of the antenna unit $278_{3,5}$, in response to the control signal on the control line $282_{3,5}$ having a level that inactivates the lumped element $280_{3,5}$, the coupling region $276_{3,5}$ presents a large impedance to the gap $286_{3,5}$, and thus blocks the signal propagating along the waveguide $260_3$ from coupling to, and exciting, the antenna element $262_{3,5}$. Therefore, the antenna element $262_{3,5}$ radiates little or no energy.

In contrast, in response to the control signal on the control line $282_{3,5}$ having a level that activates the lumped element $280_{3,5}$, the coupling region $276_{3,5}$ presents a small impedance to the gap $286_{3,5}$, and thus couples the signal propagating along the waveguide $260_3$ to the antenna element $262_{3,5}$ such that the signal excites the antenna element. Therefore, the excited antenna element $262_{3,5}$ radiates energy at the same frequency or frequencies as the frequency or frequencies of the signal propagating along the waveguide $260_3$. For example, when the lumped element $280_{3,5}$ is active, the coupling region $276_{3,5}$ is configured to form, together with the antenna element $262_{3,5}$, a series-resonant circuit having a resonant frequency of approximately $f_0$. As is known, at its resonant frequency, a series-resonant circuit has a low impedance, ideally zero impedance. Because the signal propagating along the waveguide $260_3$ has a frequency of approximately $f_0$, the region $276_{3,5}$, when the lumped element $280_{3,5}$ is active, presents a low impedance to the signal. To implement such a selectively resonant circuit, the lumped element $280_{3,5}$ can be, or can include, a semiconductor device, such as a PN-junction, or PIN, diode, field-effect transistor (FET), or other device that, when activated, alters the impedance of the coupling region $276_{3,5}$ such that the coupling region forms, at $f_0$, a series-resonant circuit with the antenna element $262_{3,5}$, or between the conductive strip $272_3$ and the antenna element.

Still referring to FIG. 12, although only the antenna unit $278_{3,5}$ is described, all of the other antenna units 278 of the transmit-antenna section 14 (FIGS. 1 and 10-11) can have the same structure, and can operate in the same manner, as the antenna unit $278_{3,5}$.

Referring to FIGS. 1 and 10-12, further details of the transmit-antenna section 14 and the antenna units 278 can be found in the following documents, which are incorporated by reference herein: U.S. patent application Ser. No. 14/506,432, titled Surface Scattering Antennas With Lumped Elements, which was filed on 3 Oct. 2014, and U.S. Pat. No. 9,450,310, titled Surface Scattering Elements, which was filed on 14 Oct. 2011.

Still referring to FIGS. 1 and 10-12, alternate embodiments of the transmit antenna section 14 are contemplated.

For example, if the antenna section 14 has multiple waveguides 260, then each waveguide may be coupled to a respective RV output 24. Furthermore, the receive antenna section 16 may have a structure and configuration that are similar to the structure and configuration of the transmit antenna section 14. Moreover, embodiments described above in conjunction with FIGS. 1-9 may apply to the transmit antenna section 14.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

The invention claimed is:

1. An antenna array, comprising:
a transmit antenna having, in one dimension, a first size, having, in another dimension that is approximately orthogonal to the one dimension, a second size that is greater than the first size, and including transmit antenna units each configured to transmit, in response to a transmit reference signal, a respective transmit signal having a wavelength, a respective distance, in the other dimension, between corresponding locations of each pair of adjacent ones of the transmit antenna units being less than one half the wavelength; and
a receive antenna having, in approximately the one dimension, a third size, having, in approximately the other dimension, a fourth size that is less than the third size, including receive antenna units each configured to receive a respective receive signal having the wavelength, a respective distance, in the one dimension, between corresponding locations of each pair of adjacent ones of the receive antenna units being less than one half the wavelength, and configured to combine the respective receive signals into a receive reference signal.

2. The antenna array of claim 1 wherein:
the second size is at least five times greater than the first size; and
the third size is at least five times greater than the fourth size.

3. The antenna array of claim 1 wherein:
the one dimension is an azimuth dimension; and
the other dimension is an elevation dimension.

4. The antenna array of claim 1 wherein:
the one dimension is an elevation dimension; and
the other dimension is an azimuth dimension.

5. The antenna array of claim 1 wherein:
the transmit antenna is approximately rectangular; and
the receive antenna is approximately rectangular.

6. The antenna array of claim 1 wherein the transmit antenna units are arranged in a single row or a single column.

7. The antenna array of claim 1 wherein the transmit antenna units are arranged in multiple rows or multiple columns.

8. The antenna array of claim 1 wherein the receive antenna units are arranged in a single row or in a single column.

9. The antenna array of claim 1 wherein the receive antenna units are arranged in multiple rows or multiple columns.

10. A subsystem, comprising:
an antenna array, including
a transmit antenna having, in one dimension, a first size, having, in another dimension that is approximately orthogonal to the one dimension, a second size that is greater than the first size, and including transmit antenna units each configured to transmit, in response to a transmit reference signal, a respective transmit signal having a wavelength, a respective distance, in the other dimension, between corresponding locations of each pair of adjacent ones of the transmit antenna units, being less than one half the wavelength; and
a receive antenna having, in approximately the one dimension, a third size, having, in approximately the other dimension, a fourth size that is less than the third size, including receive antenna units each configured to receive a respective receive signal having the wavelength, a respective distance, in the one dimension, between corresponding locations of each pair of adjacent ones of the receive antenna units, being less than one half the wavelength, and configured to combine the respective receive signals into a receive reference signal; and
a controller circuit configured to cause
the transmit antenna to generate a transmit beam having, in the one dimension, a first width, and having, in the other dimension, a second width that is narrower than the first width, and
the receive antenna to generate a receive beam that spatially overlaps the transmit beam and that has, in the one dimension, a third width, and that has, in the other dimension, a fourth width that is wider than the third width.

11. The subsystem of claim 10 wherein:
the controller circuit is further configured to cause
the transmit antenna to steer the transmit beam in the other dimension from one position to another position, and
the receive antenna to steer the receive beam in the one dimension from one position to another position.

12. The subsystem of claim 10 wherein:
the controller circuit is further configured to cause
the transmit antenna to steer the transmit beam in the other dimension to positions in a sequence, and
the receive antenna to maintain the receive beam in a same position while the controller circuit causes the transmit antenna to steer the transmit beam to the positions.

13. The subsystem of claim 10 wherein:
the controller circuit is further configured to cause
the receive antenna to steer the receive beam in the one dimension to positions in a sequence, and
the transmit antenna to maintain the transmit beam in a same position while the controller circuit causes the receive antenna to steer the receive beam to the positions.

14. The subsystem of claim 10 wherein the controller circuit includes a master controller circuit.

15. The subsystem of claim 10 wherein the controller circuit includes a beam-steering controller circuit.

16. The subsystem of claim 10 wherein the controller circuit includes a beam-steering controller circuit and a master controller circuit.

17. The subsystem of claim 10, further comprising:
a transceiver configured
to generate in response to the controller circuit, and to provide to the transmit antenna, the transmit reference signal, and
to receive from the receive antenna, and to provide to the controller circuit, the receive reference signal; and
wherein the controller circuit is further configured
to cause the transmit antenna to generate the transmit beam in response to the transmit reference signal,
to cause the receive antenna to generate the receive reference signal in response to the receive beam, and
to determine, in response to the receive reference signal, whether there is an object in a location corresponding to a region of spatial overlap between the transmit beam and the receive beam.

18. A system, comprising:
a vehicle; and
a radar subsystem, including
an antenna array, including
a transmit antenna having, in one dimension, a first size, having, in another dimension that is approximately orthogonal to the one dimension, a second size that is greater than the first size, and including transmit antenna units each configured to transmit, in response to a transmit reference signal, a respective transmit signal having a wavelength, a respective distance, in the other dimension, between corresponding locations of each pair of adjacent ones of the transmit antenna units, being less than one half the wavelength; and
a receive antenna having, in approximately the one dimension, a third size, having, in approximately the other dimension, a fourth size that is less than the third size, including receive antenna units each configured to receive a respective receive signal having the wavelength, a respective distance, in the one dimension, between corresponding locations of each pair of adjacent ones of the receive antenna units being less than one half the wavelength, and configured to combine the respective receive signals into a receive reference signal; and
a controller circuit configured to cause
the transmit antenna to generate a transmit beam having, in the one dimension, a first width, and having, in the other dimension, a second width that is narrower than the first width, and
the receive antenna to generate a receive beam that spatially overlaps the transmit beam and that has, in the one dimension, a third width, and that has, in the other dimension, a fourth width that is wider than the third width.

19. The system of claim 18 wherein the vehicle includes an automobile.

20. The system of claim 18 wherein the vehicle includes an autonomous automobile.

21. The system of claim 18 wherein the vehicle includes a drone.

22. The system of claim 18 wherein the vehicle includes an aircraft.

23. The system of claim 18 wherein the vehicle includes a spacecraft.

24. The system of claim 18 wherein the radar subsystem is disposed onboard the vehicle.

25. The system of claim 18, further comprising a drive assembly disposed onboard the vehicle, the drive assembly including:
- a steering unit configured to configure the vehicle for movement in a direction; and
- a propulsion unit configured to propel the vehicle in the direction.

26. A method, comprising:
- generating, with a first holographic-aperture antenna, a transmit beam having a larger size in a first dimension and a smaller size in a second dimension that is approximately perpendicular to the first dimension; and
- generating, with a second holographic-aperture antenna, a receive beam having a larger size in the second dimension, having a smaller size in the first dimension, and spatially overlapping the transmit beam.

27. The method of claim 26 wherein generating the receive beam includes generating the receive beam temporally overlapping the transmit beam.

28. The method of claim 26 wherein generating the receive beam includes generating the receive beam during a time period during which the transmit beam is not generated.

29. The method of claim 26, further comprising determining whether an object is present in a region of overlap between the transmit beam and the receive beam in response to the receive beam.

30. A method, comprising:
- transmitting, with a first holographic-aperture antenna, a beam having a larger size in a first dimension and a smaller size in a second dimension that is approximately perpendicular to the first dimension; and
- filtering, with a second holographic-aperture antenna, a redirected portion of the beam to generate a resulting beam having, in the first dimension, a size that is smaller than the size of the beam in the first dimension.

31. The method of claim 30 wherein the size of the resulting beam in the first dimension is approximately the size of the beam in the second dimension.

32. The method of claim 30, further comprising analyzing the resulting beam to determine whether an object lies in a path of the resulting beam.

33. The method of claim 30 wherein filtering the redirected portion of the beam includes spatially filtering the redirected portion of the beam.

34. The antenna array of claim 1 wherein:
- at least one of the transmit antenna units includes multiple transmit antenna elements; and
- at least one of the receive antenna units includes multiple receive antenna elements.

35. The antenna array of claim 1 wherein:
- at least one of the transmit antenna units includes respective transmit antenna elements arranged in a single row or a single column in the one dimension; and
- at least one of the receive antenna units includes respective receive antenna elements arranged in a single row or a single column in the other dimension.

36. The subsystem of claim 10 wherein:
- at least one of the transmit antenna units includes multiple transmit antenna elements; and
- at least one of the receive antenna units includes multiple receive antenna elements.

37. The subsystem of claim 10 wherein:
- at least one of the transmit antenna units includes respective transmit antenna elements arranged in a single row or a single column along the one dimension; and
- at least one of the receive antenna units includes respective receive antenna elements arranged in a single row or a single column along the other dimension.

38. The system of claim 18 wherein:
- at least one of the transmit antenna units includes multiple transmit antenna elements; and
- at least one of the receive antenna units includes multiple receive antenna elements.

39. The system of claim 18 wherein:
- at least one of the transmit antenna units includes respective transmit antenna elements arranged in a single row or a single column extending in the one dimension; and
- at least one of the receive antenna units includes respective receive antenna elements arranged in a single row or a single column extending in the other dimension.

* * * * *